United States Patent
Augugliaro et al.

(10) Patent No.: US 11,643,205 B2
(45) Date of Patent: May 9, 2023

(54) SYSTEMS AND METHODS FOR CHARGING, TRANSPORTING, AND OPERATING FLYING MACHINES

(71) Applicant: VERITY AG, Zurich (CH)

(72) Inventors: Federico Augugliaro, Zurich (CH); Raffaello D'Andrea, Wollerau (CH); Markus Hehn, Zurich (CH); Mark W. Mueller, Berkeley, CA (US); Philipp Reist, Zurich (CH); Markus Waibel, Zurich (CH)

(73) Assignee: VERITY AG, Zurich (CH)

( * ) Notice: Subject to any disclaimer, the term of this patent is extended or adjusted under 35 U.S.C. 154(b) by 0 days.

(21) Appl. No.: 17/566,430

(22) Filed: Dec. 30, 2021

(65) Prior Publication Data

US 2022/0119110 A1    Apr. 21, 2022

Related U.S. Application Data

(63) Continuation of application No. 17/131,055, filed on Dec. 22, 2020, now Pat. No. 11,214,368, which is a
(Continued)

(51) Int. Cl.
  *B64C 39/02* (2006.01)
  *B64F 1/16* (2006.01)
  *G08G 5/00* (2006.01)

(52) U.S. Cl.
  CPC .............. *B64C 39/024* (2013.01); *B64F 1/16* (2013.01); *B64C 2201/042* (2013.01);
  (Continued)

(58) Field of Classification Search
  CPC ... B64C 39/024; B64C 39/02; B64C 2201/18; B64C 2201/201; B64F 1/16; G08G 5/0013; G08G 5/0069; G08G 5/00
  See application file for complete search history.

(56) References Cited

U.S. PATENT DOCUMENTS 7,398,946 B1    7/2008 Marshall
7,714,536 B1    5/2010 Silberg et al.
(Continued)

FOREIGN PATENT DOCUMENTS

JP    2007217248 A    8/2007
JP    2015-042539    3/2015
(Continued)

OTHER PUBLICATIONS

International Search Report and Written Opinion of the International Searching Authority for Application No. PCT/IB2017/051165, dated Sep. 6, 2017.

*Primary Examiner* — Robert L Deberadinis
(74) *Attorney, Agent, or Firm* — Haley Guiliano LLP

(57) ABSTRACT

A flying machine storage container is provided that comprises multiple charging stations and a clamping mechanism. The clamping mechanism is configured to secure flying machines in the charging stations and securely close charging circuits between the storage container and the flying machines. A system for launching flying machines is also provided. The system comprises two regions and a transition region between the two regions. The two regions each constrain the positioning of a flying machine and the transition region enables a flying machine to move from the first region to the second region to reach an exit. A flying machine having sufficient performance capabilities will be able to successfully launch. Centralized and decentralized communication architectures are also provided for communicating data between a central control system, multiple storage containers, and multiple stored flying machines stored at each of the storage containers.

20 Claims, 17 Drawing Sheets

Related U.S. Application Data continuation of application No. 16/080,987, filed as application No. PCT/IB2017/051165 on Feb. 28, 2017, now Pat. No. 10,899,445.

(60) Provisional application No. 62/460,703, filed on Feb. 17, 2017, provisional application No. 62/301,524, filed on Feb. 29, 2016.

(52) U.S. Cl.
CPC .... *B64C 2201/18* (2013.01); *B64C 2201/201* (2013.01); *G08G 5/0013* (2013.01); *G08G 5/0069* (2013.01)

(56) References Cited

U.S. PATENT DOCUMENTS

| | | |
|---|---|---|
| 9,143,769 B2 | 9/2015 | Ratti |
| 9,238,414 B2 | 1/2016 | Ryberg et al. |
| 2014/0025229 A1 | 1/2014 | Levien et al. |
| 2014/0032034 A1 | 1/2014 | Raptopoulos et al. |
| 2014/0249693 A1 | 9/2014 | Stark et al. |
| 2016/0001883 A1 | 1/2016 | Sanz et al. |
| 2016/0009413 A1 | 1/2016 | Lee et al. |
| 2016/0039541 A1 | 2/2016 | Beardsley et al. |

FOREIGN PATENT DOCUMENTS

| | | |
|---|---|---|
| WO | WO 2003/059735 | 7/2003 |
| WO | WO 2015/195175 | 12/2015 |

SYSTEMS AND METHODS FOR CHARGING, TRANSPORTING, AND OPERATING FLYING MACHINES

CROSS-REFERENCE TO RELATED APPLICATIONS

This application is a continuation of U.S. patent application Ser. No. 17/131,055, filed Dec. 22, 2020, which is a continuation of U.S. patent application Ser. No. 16/080,987, filed Aug. 29, 2018 (now U.S. Pat. No. 10,899,445), which is a U.S. National Phase Application filed under 35 U.S.C. § 371 from International Patent Application No. PCT/IB2017/051165, filed on Feb. 28, 2017, which claims priority to U.S. Provisional Patent Application No. 62/301,524, filed on Feb. 29, 2016, and U.S. Provisional Patent Application No. 62/460,703, filed on Feb. 17, 2017, all of which are hereby incorporated by reference herein in their entireties.

FIELD

This application relates generally to charging, transporting, and operating machines such as flying machines.

BACKGROUND

Flying machines are well known in the art. Flying machines include, for example, single and multirotor machines such as quadcopters. For a battery-operated flying machine, a separate charger is typically provided and used for charging the battery. The charging process is a manually operated process. For example, a user may need to physically remove the battery from a flying machine, physically connect the battery to a charger, and connect the charger to a power source. Once the battery is charged, the battery needs to be physically disconnected from the charger and reconnected to the flying machine.

Containers such as hard cases and soft packs are available for storing and transporting flying machines. The containers are typically configured to store a single flying machine and may also be configured to store accessories such as extra rotors, an extra battery, a controller for controlling the flying machine, and a charger. In some containers, it may be possible to store two flying machines.

When using multiple flying machines, a user typically uses multiple containers, where each container stores one or two flying machines. The user needs to manually unpack the containers and separately position each of the flying machines for use. When done, the user needs to manually recharge the batteries and manually repack each flying machine into a corresponding container. This is a time consuming process, particularly when using a large number of flying machines.

Flying machines, like other machines, can malfunction or have degraded performance. This presents a particular problem for flying machines, especially those heavier than air, because, unlike most machinery operating on the ground, they must continue to operate even after a malfunction or with degraded performance to avoid a crash. An unchecked malfunction or degraded performance cyan result in damage to the flying machine, other surrounding objects, and injury to people. In manned aircraft, human pilots with extensive training perform pre-flight checks. Many unmanned aircraft and flying machines, however, are operated by pilots without comparable training or operate partially or fully autonomously. Such flying machines often also have different operating constraints, including cost. There is therefore a need for systems and methods ensuring that flying machines have sufficient performance and are fit for flight before or during take off.

Flying machines, sometimes in large numbers, have been used to create visual displays and performances. For example, flying machines have been programmed to follow particular flight paths in a coordinated light show in the sky. The programming and setup of the flying machines for such performances is a manual and tedious process.

Accordingly, the present disclosure discloses improved systems and methods for storing and charging flying machines. The present disclosure also discloses improved systems and methods for operating machines.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

In accordance with the present disclosure, limitations of current systems for storing, charging, and operating flying machines have been reduced or eliminated. In addition, the present disclosure provides various technical advantages over current systems.

In some embodiments, charging container systems and methods provide integrated charging and transporting of multiple flying machines. The charging container may be used in the following way. One or more flying machines are placed onto a charging station. This may be achieved manually or automatically (e.g., by autonomously landing the flying machines on the charging container). Once the desired number of flying machines are positioned on the charging container, a clamping mechanism is used to mechanically fixate the flying machines' positions in the container. An electric circuit may be simultaneously closed by connecting charging terminals on the charging stations (e.g., a charging plate, a charging rod, magnets coated in conductive material, or the like) to charging connectors on the flying machine (e.g., conductive material on the cage of the flying machine, conductive material on the flying machine's body, conductive leaf springs, conductive pins, magnets coated in conductive material, or the like). This may be achieved, for example, by structuring and arranging the container and its components such that the clamping mechanism forces the flying machines against two charging plates (e.g., by sandwiching the flying machines between an upper charging plate and a lower charging plate). As another example, this may be achieved by structuring and arranging the container and its components such that the clamping mechanism clamps the flying machines between first and second charging rods. As a further example, the electric circuit may be closed without an additional clamping action as soon as the flying machine is positioned on the charging station. In this example, the connection could be made assisted by gravity, for example when conductive leaf-springs located on the flying machine body are pressed onto the charging plate of the charging station by the gravitational force acting on the flying machine.

In some embodiments, an electric circuit allows for charging the flying machines. This is achieved by connecting a charging module through a first charging terminal, a first flying machine connector, the flying machine battery, a second flying machine connector, a second charging terminal, and back to the charging module. In some embodiments, the circuit may comprise a charging control circuit that is physically located on the flying machine (e.g., in between the flying machine connectors and the flying machine battery) and that monitors and controls the charging process of the battery. The charging control circuit may, for example, perform battery balancing, and may perform monitoring processes such as state of charge (SOC) or remaining useful life (RUL) estimation.

Figure 1A:
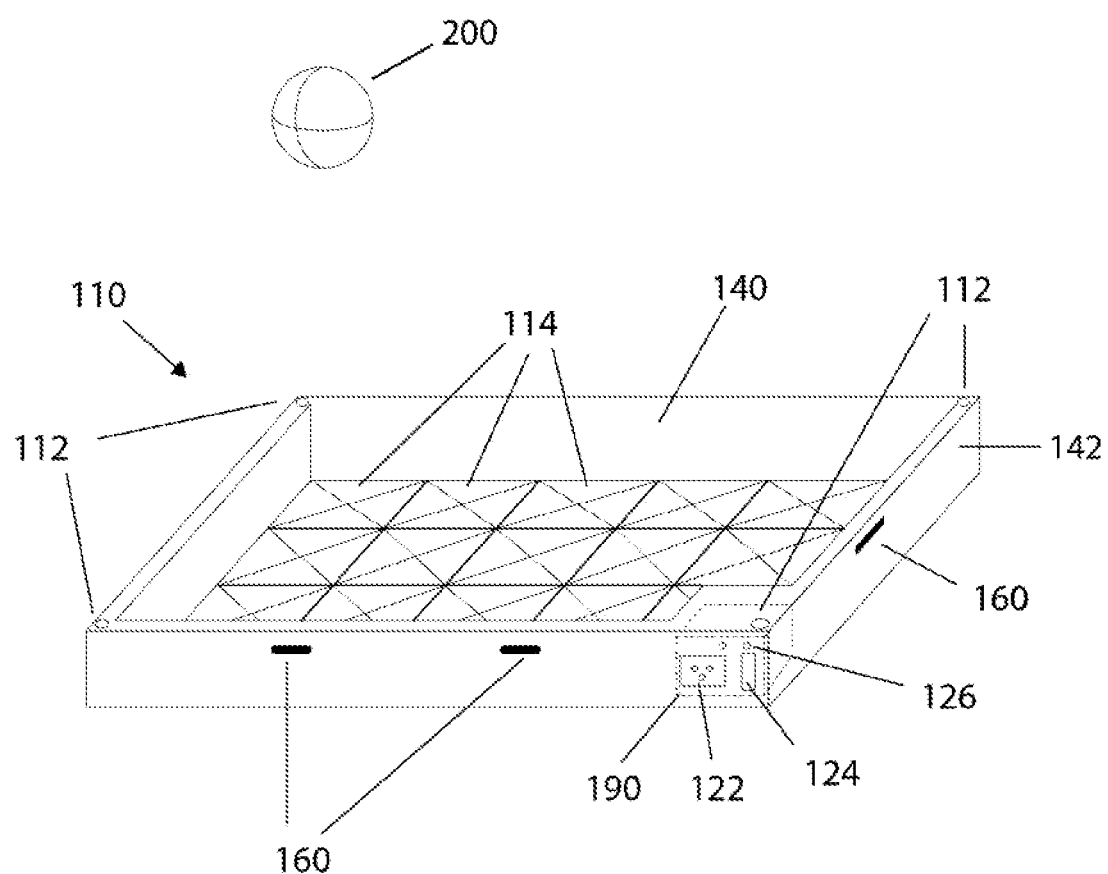
FIG. 1A shows a base of a charging container in accordance with some embodiments of the present disclosure.
Figure 1B:
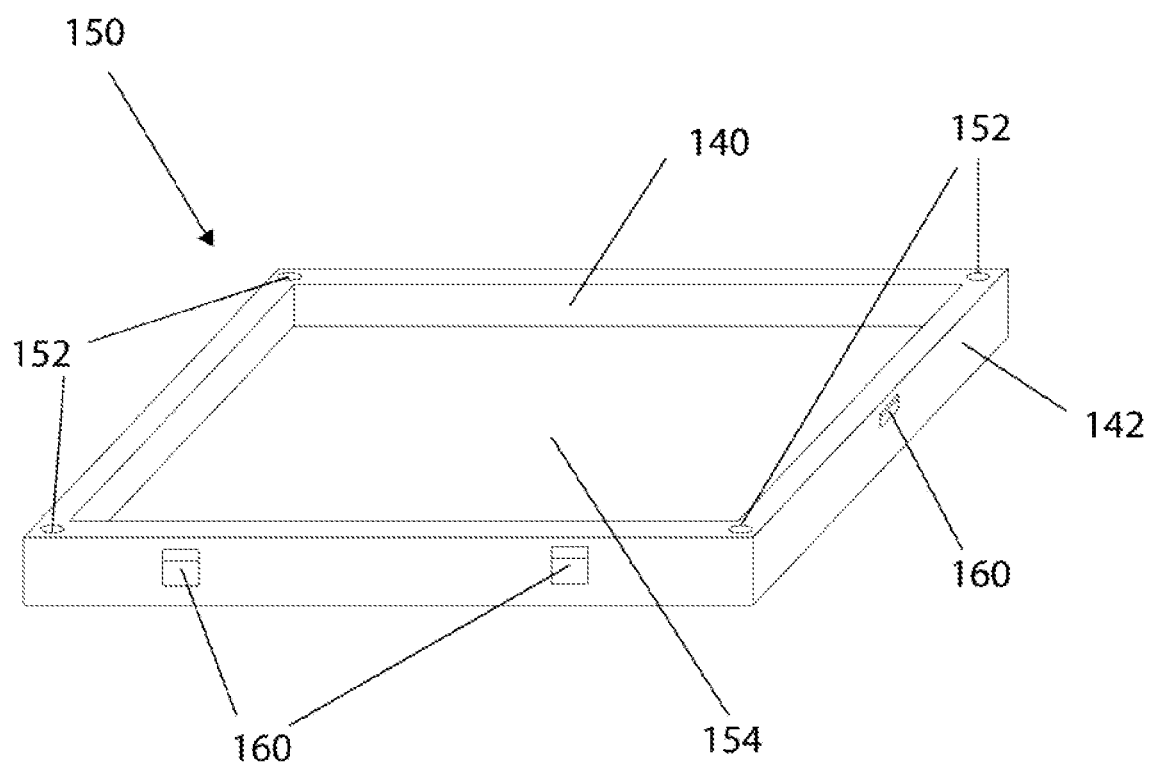
FIG. 1B shows a lid of a charging container in accordance with some embodiments of the present disclosure.

FIG. 1A shows a base 110 of a charging container and FIG. 1B shows a lid 150 of a charging container in accordance with some embodiments of the present disclosure. Base 110 comprises a charging plate 114, which comprises conductive material structured and arranged to establish an electrical connection with a flying machine (e.g., flying machine 200) placed on its surface. It will be understood that flying machine 200 is depicted as a circular cage for simplification. Flying machine 200 can be any suitable shape and size. Charging plate 114 may include multiple charging stations, each capable of receiving and charging a flying machine. In some embodiments, each square depicted on plate 114 of FIG. 1A may be a charging station. In some embodiments, charging plate 114 may comprise separate charging terminals for each charging station.

Charging plate 114 is electrically connected to a charging module 190, which is electrically connected to a power socket 122, an on/off power switch 124, and status LEDs 126. Power socket 122 supplies power to charging module 190 via an external power cable (not shown). Power switch 124 allows a user to interrupt the power connection. Status LEDs 126 inform a user of the electrical state of the charging container. For example, LEDs 126 may indicate whether power is being supplied to charging module 190. As another example, LEDs 126 may indicate the charging status at each charging station, such as whether a flying machine is electrically connected to the charging station, whether a flying machine is being charged, and/or whether a flying machine is fully charged.

In some embodiments, more advanced interfaces may be provided as part of the charging container. For example, an integrated LCD display or a touch screen may be provided to enable a user to control the operation of the charging container. As another example, additional connectivity may be provided, such as Wi-Fi and Ethernet.

Base 110 may comprise one or more inner connectors 112. Each of inner connectors 112 may be structured and arranged to be electrically coupled to a corresponding inner connector (e.g., inner connector 152 of FIG. 1B) on a lid when the lid is positioned on base 110 (e.g., as in FIG. 1C or FIG. 1D) or on an additional base when the additional base is positioned on base 110 (e.g., as in FIG. 1D). The electrical coupling between inner connectors 112 and 152 can be achieved using any suitable connector (e.g., a spring-loaded connector or any other suitable electrical connector).

Base 110 of FIG. 1A and lid 150 of FIG. 1B each include an inner wall 140. Inner wall 140 may be used as a charging plate (e.g., charging plate 114 of FIG. 1A and charging plate 154 of FIG. 1B), may be made from a non-conductive material, or a combination thereof. Base 110 of FIG. 1A and lid 150 of FIG. 1B each include an outer wall 142. Outer wall 142 may be equipped with one or more clamping mechanisms 160 (e.g., a clasp, a latch, etc.) for securing base 110 and lid 150 together. Outer wall 142 may also be equipped with one or more handles (not shown) for easy transport.

Base 110 provides mechanical support for lid 150 or for another base. When flying machines are placed on the charging plate automatically, base 110 may be used to aid navigation during a flying machine's landing or docking maneuver. This may be achieved by (1) integrating well defined features (e.g., markings, position LEDs, light emitters, radio frequency (RF) emitters) at well-defined positions on base 110, (2) equipping flying machines with sensors suitable to detect these features (e.g., vision sensors, RF sensors), and (3) executing a landing or docking sequence on the flying machine in dependence of the sensor readings representative of the flying machine's current position relative to the well-defined features, the flying machine's desired landing or docking position (e.g., charging station), and a known location of the well-defined features relative to the desired landing or docking position.

Figure 1C:
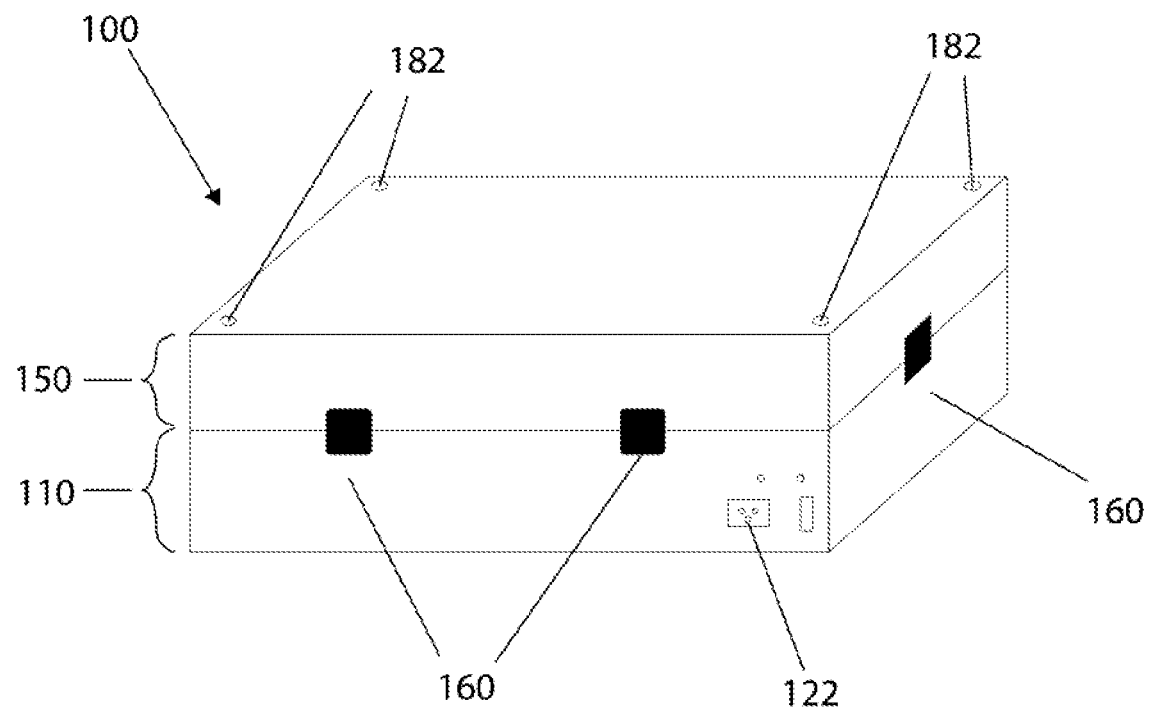
FIG. 1C shows a charging container that includes a single base and a single lid in accordance with some embodiments of the present disclosure.

FIG. 1C shows a charging container 100 that includes a single base 110 and single lid 150. As illustrated, charging container 100 is equipped with clamping mechanisms 160 to connect the base and lid for charging and/or transport.

Lid 150 of FIG. 1C may also comprise one or more outer connectors 182. Outer connectors 182 may be structured and arranged to connect to a corresponding outer connector 182 on another charging container when multiple containers are stacked. The electrical coupling between the outer connectors may, for example, be achieved using a spring-loaded connection plug. The outer connectors may supply multiple charging containers with power through a single power socket 122. An outer connector may include safety circuitry that ensures that it is only powered when in contact with another suitable outer connector.

It will be understood that charging container 100 of FIG. 1C can be used individually or in combination with additional charging containers in a stack. When charging container 100 of FIG. 1C is intended to be stacked with additional charging containers, additional clamping mechanisms can be used to secure the charging containers together. It will also be understood that the charging module of one charging container can be used to charge flying machines of additional charging containers. In some embodiments, the power socket and on/off power switch may be omitted in the additional charging containers.

Figure 1D:
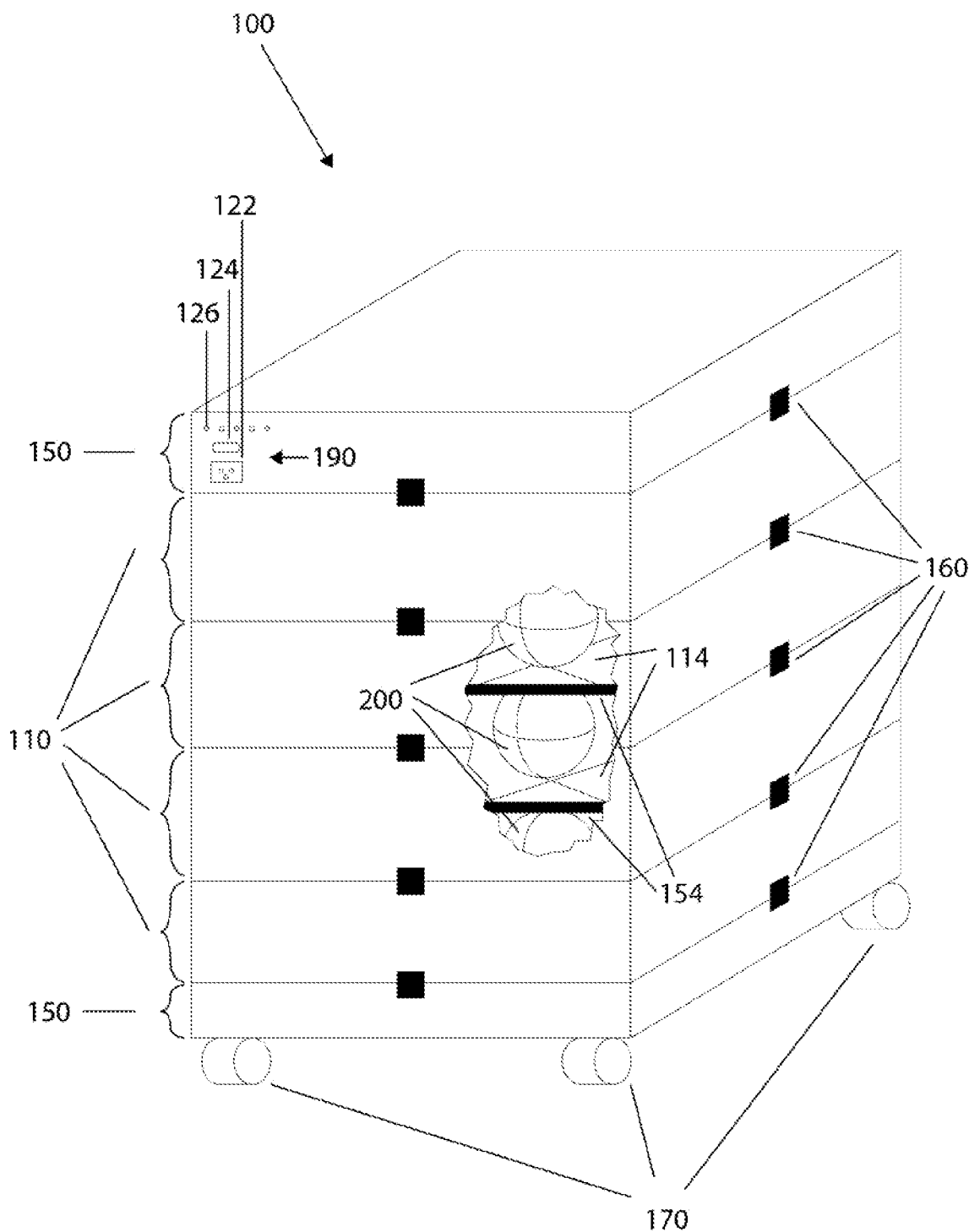
FIG. 1D shows an integrated embodiment where an integrated charging container comprises multiple bases and lids in accordance with some embodiments of the present disclosure.

FIG. 1D shows an integrated embodiment where an integrated charging container 100 comprises multiple bases 110 and lids 150 in accordance with some embodiments of the present disclosure.

Integrated charging container 100 is composed of two end lids 150 that are used as the top and bottom of the integrated charging container. The bottom lid is equipped with wheels 170 to allow for easy transport. In this embodiment, charging module 190, power socket 122, power switch 124, and status LEDs 126 are included in top lid 150. In this embodiment, each of the four bases 110 are structured and arranged to include two charging plates 114 and 154. Flying machines 200 are sandwiched between a first charging plate 114 of the lower base 110 and a second charging plate 154 of the upper base 110. The different layers of integrated charging container 100 can be connected together using clamping mechanisms 160.

This embodiment allows for particularly compact charging, storage, or transport of a large number of flying machines 200. Variations of this exemplary embodiment are possible. For example, the charging containers may be fashioned as drawers. As another example, the inner connectors may be fashioned as connection plugs or connection cables.

Figure 2A:
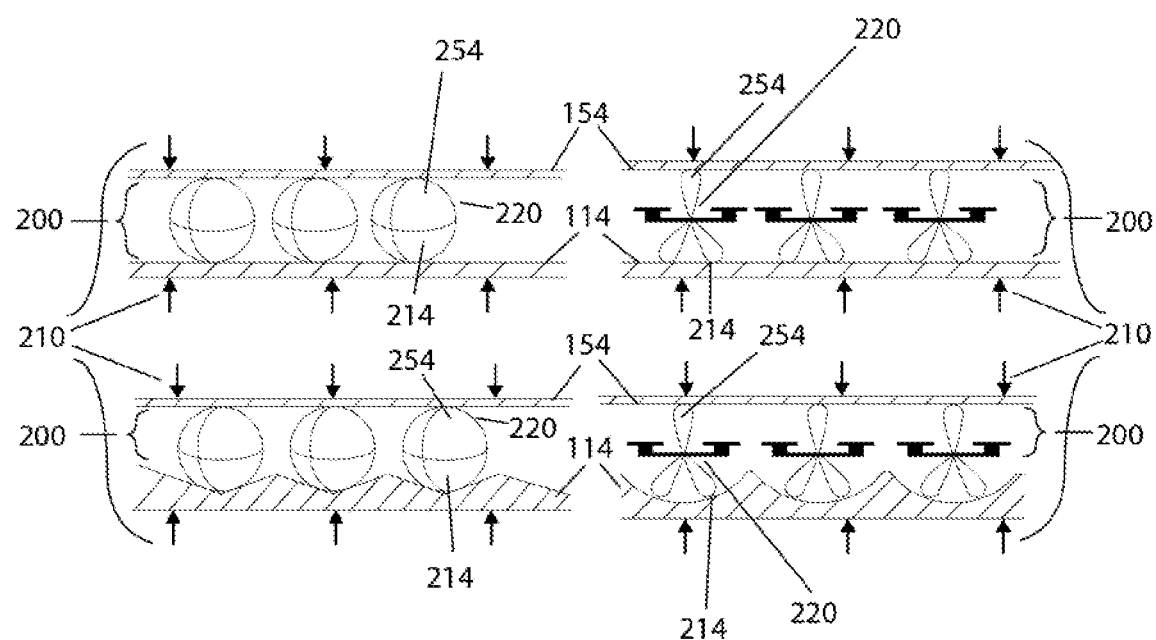
FIG. 2A shows a side view of four exemplary embodiments for sandwiching flying machines between charging plates in accordance with some embodiments of the present disclosure.

FIG. 2A shows a side view of four exemplary embodiments for sandwiching flying machines 200 between charging plates 114 and 154 in accordance with some embodiments of the present disclosure. Sandwiching is achieved by applying a force 210 between charging plates 114 and 154. This may be achieved by using a clamping mechanism.

Each flying machine 200 comprises at least two connectors 214 and 254 connected to its body 220. Connectors 214 and 254 alloy for electrical contact with charging plates 114 and 154. This may be achieved by selecting materials with suitable conductivity in dependence of the charging voltage and amperage required by the flying machines' batteries and operating parameters (e.g., minimum charging time, size of the battery), suitable weight in dependence of the flying machines' payload, suitable shape in dependence of the flying machines' dynamic as well as aerodynamic properties, and suitable connection properties (e.g., spring loaded connectors, magnetic connectors) in dependence of the shape and surface properties of the flying machines and charging plates. Electrical contact may further be achieved by accounting for potential structural deformations in dependence of force 210 as a result of clamping.

Connectors 214 and 254 may simultaneously be used to fix flying machines 200 into position for storage and transport. This may be achieved by (1) using a clamping mechanism to apply a force to flying machines 200 sandwiched between plates 114 and 154; (2) structuring and arranging connectors 214 and 254 to prevent movement of flying machines 200 when sandwiched between plates 114 and 154 in dependence of the friction between connectors 214 and 254 and charging plates 114 and 154; and (3) structuring and arranging plates 114 and 154 and flying machine bodies 220 to allow sandwiching without suffering structural damage.

In some embodiments, the charging container may comprise mechanical guides. For example, charging plate 114 may have embedded recesses that function as mechanical guides. Such guides may be used for guiding the flying machines into specific positions or into specific orientations when they are placed into the box. This guiding process is typically passive, i.e. the flying machines slide into position/orientation when they are placed into the box 100. Various refinements may be used to ease this process. Examples include using low friction materials for contact points between flying machines 200 and the charging container (e.g., polished metal); adapting the shape of flying machines' bodies; adapting the shape of flying machines' cages or shrouds (e.g., using a spherical cage); shaking base 110 (e.g., manually or automatically (e.g., using a vibration motor)); having flying machine 200 perform a dedicated landing maneuver (e.g., a docking maneuver); using magnets on flying machine 200 or charging container 100 (e.g., permanently magnetized material or electromagnets), or positioning a charging container 100 or its bases 110 at an angle (e.g., equipping containers with a support that allows prop-up at an angle when placed on the floor or equipping the charging box with an angled base), or others (e.g., supplementing the charging container with a landing board (not shown) that acts as a chute or funnel for collecting, sorting, or placing the flying machines). Examples of mechanical guides include indentations, notches, funnels, rails, or grooves.

Guides may also be used to place flying machines 200 into position for fixation or transport. This may be achieved by structuring and arranging the guides to match the shape of the flying machines. In the example embodiment in FIG. 1A, mechanical guides in the shape of inverted pyramids are used, fashioned such that their size is matched to the shape of the flying machines' spherical cage.

Guides may also be used to place flying machines into a specific pattern. For example, the inverted square pyramids shown in the example embodiment in FIG. 1A may be used to arrange flying machines in a grid pattern. Similarly, triangular or hexagonal pyramids may be used to arrange flying machines into an isometric or hexagonal grid. Similarly, many other tessellations or patterns may be achieved.

Arrangements may be used for aesthetic reasons (e.g., when using the flying machines as part of a lighting display). Arrangements may be used to allow guiding into a position for charging or transport. This may allow to guide many flying machines with very little or entirely without manual manipulation. Arrangements may also be used to allow for autonomous take off or landing, for example by structuring and arranging them to allow for free movement of their actuators (e.g., by mechanically ensuring that the actuator's movement is not restricted by obstacles including the guides, chargers, and other flying machines). As another example, they may be structured and arranged to allow for free air flow/turbulence reduction of multiple flying machines taking off from or landing on the same container in close succession (e.g., by using data representative of their location in the container for determining their take off or landing sequence or by equipping the container with air ducts, vents, wire grids, or flow guides to reducing the creation of air cushions). As another example, arrangements may allow for more reliable take off maneuvers by ensuring that the orientation (e.g., the flying machine's yaw) is known (e.g., through mechanical guides or sensors. Similarly, arrangements may allow for calibration routines. In some embodiments, flying machines are marked to allow for easy visual checking of their position and orientation in the container (e.g., with a color coded band on one of their arms). In some embodiments, flying machines are structured and arranged to communicate a flying machine identifier to a container. In some embodiments, the container is structured and arranged to communicate a charging station identifier to a flying machine at that charging station.

Guides may also be used to place flying machines into position for electrical charging. This may be useful to ensure correct positive and negative polarity of the connections. This may also be useful for flying machines equipped with additional connectors (e.g., for battery regulation, battery balancing, or battery communication), when using smart chargers (e.g., to determine the number of flying machines being charged simultaneously), or when using smart batteries (e.g., batteries equipped with a battery management system). This may be achieved by structuring and arranging the guides, the flying machine's connectors, and the charging terminals to allow for easy alignment and connection of the flying machine's connectors to the charging terminals. This may, for example, be achieved using blind mate connectors. As further examples, this may also be achieved by using mating connectors that are spring biased or spring loaded or that comprise at least one guiding surface.

Guides may also be used to provide electrical insulation between charging circuits. This may be achieved by equipping them with insulation or manufacturing them from non-conductive material.

In some embodiments, connectors may be mechanically matched to fit the mechanical guides. This may be useful to improve the electrical connection between flying machines and the box, to improve the fixation of the flying machines during transport, or to improve the guides' efficiency at guiding flying machines into specific positions or orientations. This may be achieved by combining the features described in the present disclosure with connectors with self-aligning features that allows a small misalignment when mating. For example, a groove or slot on a charging plate with a corresponding tongue, bead, bolt, or dog on the flying machine may be used.

Referring back to FIGS. 1A-D, clamping mechanism 160 may exert a force on a plurality of flying machines simultaneously. Clamping mechanism 160 may also mechanically connect a container base 110 to a lid 150 or to an additional container. It can apply a well-defined mechanical force to flying machines 200. This may be achieved using elastic elements. For example, charging plates may be supported by foam or another elastic material or flying machine connectors may incorporate elastic material. The force may also be adjusted by adapting the type, number, or placement of clamping mechanisms, or the size or mechanical support provided by walls 140 or container base 110 to the size or structural properties of the flying machines. Exemplary clamping mechanisms include a lever operated latch, a quick clamp fastener, an elastic anchor, a spring latch, and a toggle clamp.

Figure 2B:
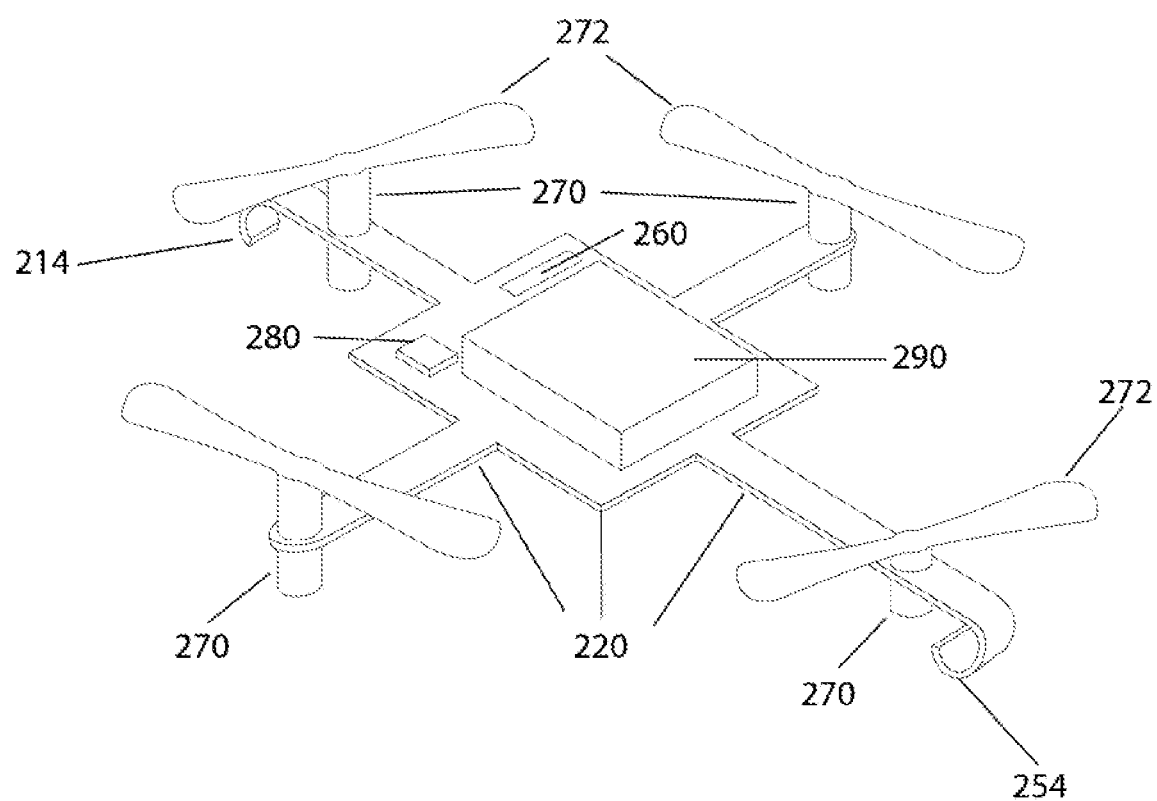
FIG. 2B shows an illustrative flying machine in accordance with some embodiments of the present disclosure.

FIG. 2B shows a flying machine 200 in accordance with some embodiments of the present disclosure. Flying machine 200 comprises a body 220, sensor 260, four actuators 270 with corresponding propellers 272, a control module 280, a battery 290, and two connectors (e.g., hooks) 214 and 254. Charging circuitry (not shown) electrically connects each of two connectors 214 and 254 to battery 290.

Figure 2C:
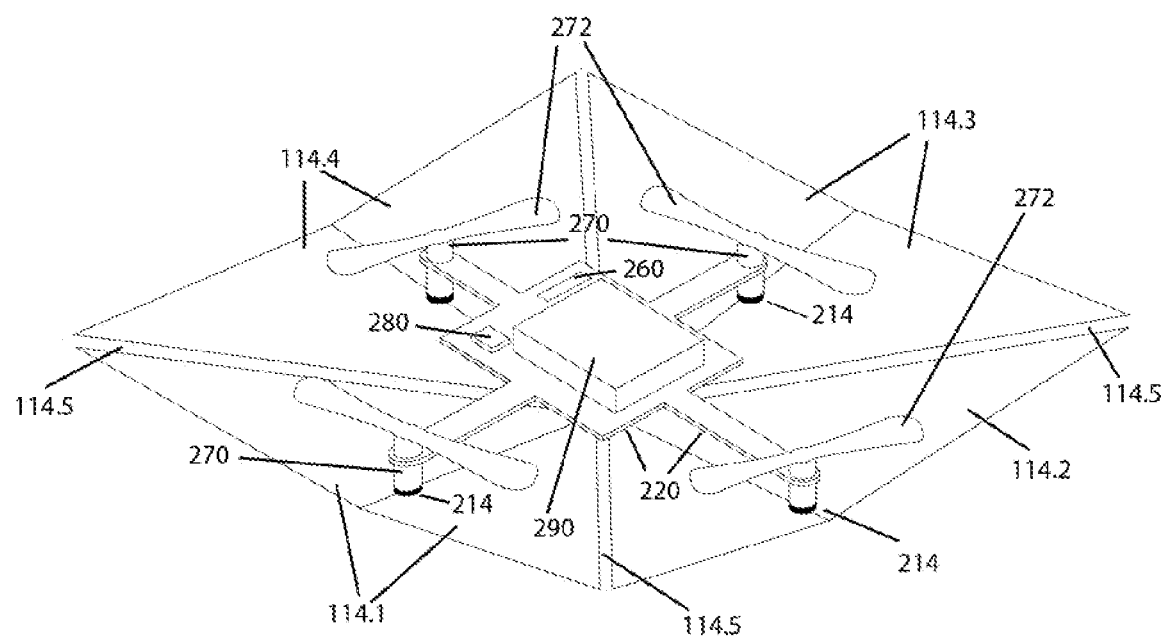
FIG. 2C shows an illustrative flying machine and charging plate in accordance with some embodiments of the present disclosure.

FIG. 2C shows a flying machine 200 and charging plate 114 in accordance with some embodiments of the present disclosure. Flying machine 200 comprises a body 220, sensor 260, four actuators 270 with corresponding propellers 272, a control module 280, a battery 290, and four connectors 214. One or more of connectors 214 (e.g., one, two, three, or all four) may comprise magnets (e.g., permanent or electromagnets) to ensure good electrical connection between the connectors and charging plate 114. In some embodiments, the magnets may be of sufficient strength to also fix flying machine 200 to charging plate 114. Circuitry (not shown) electrically connects two or more connectors 214 to components of flying machine 200 (e.g., battery 290). As shown in FIG. 2C, charging plate 114 comprises sections 114.1-5. Section 114.5 is a nonconductive section of plate 114 and it electrically isolates sections 114.1-4. Each of sections 114.1-4 may be creased or otherwise shaped to assist in positioning flying machine 200 in a desired position and orientation. In some embodiments one or more of sections 114.1-5 may comprise magnets (e.g., permanent or electromagnets) to assist guiding flying machine 200 into a desired position and orientation or to ensure good electrical connection between sections 114.1-4 and one or more of connectors 214. In some embodiments, each of sections 114.1-4 may be used as either a charging terminal or a communication interface. The entire charging plate 114 depicted in FIG. 2C may correspond to a single charging station.

Figure 2D:
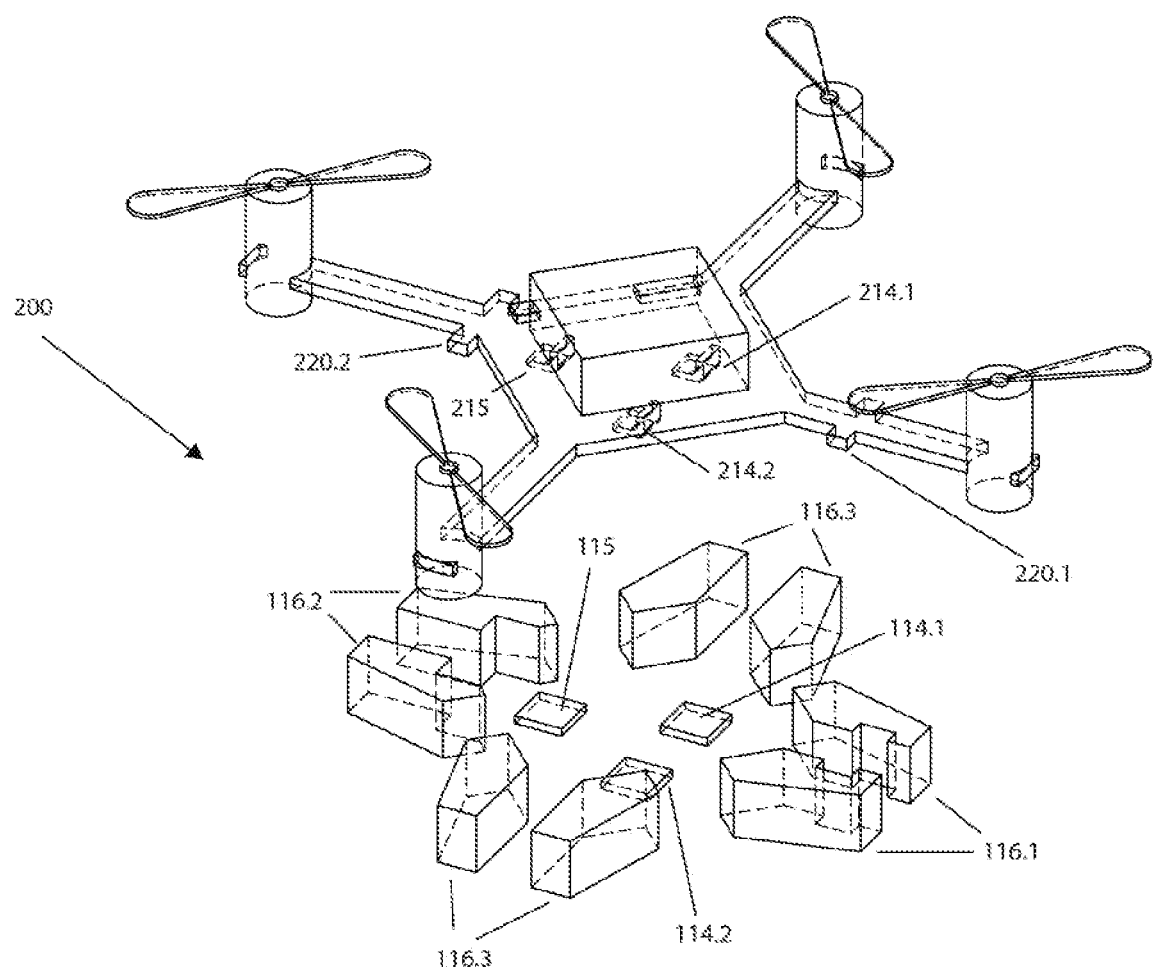
FIG. 2D shows an illustrative flying machine and a charging station in accordance with some embodiments of the present disclosure.

FIG. 2D shows another example of a flying machine 200 and a charging station in accordance with some embodiments of the present disclosure. Flying machine 200 comprises two charging connectors 214.1 and 214.2 that make contact with charging plates 114.1 and 114.2, respectively, when flying machine 200 is placed on the charging station. Flying machine 200 further comprises communication connector 215 that makes contact with communication plate 115 when the flying machine is placed on the charging station. In this example, flying machine connectors 214.1, 214.2, and 215 are appropriately dimensioned leaf-spring contacts that provide the electrical connection to corresponding charging plates 114.1 and 114.2 and communication plate 115 by deflecting under the gravitational force acting on flying machine 200, such that no additional clamping force is required. The charging plate further comprises guides 116.1-3 that restrict horizontal movement of flying machine 200 (e.g., during transport of charging container 100) when flying machine 200 is placed on the charging station. Guides 116.1 and 116.2 are shaped to match features 220.1 and 220.2 on flying machine 200, respectively, to allow only the correct orientation of flying machine 200 on the charging station, which may help to ensure correct polarity of the electrical connections. As illustrated, features 220.1 and 220.2 are located on their respective rotor arms at different distances from the center of flying machine 200. These different distances match the locations of corresponding recesses in guides 116.1 and 116.2 such that flying machine 200 will only fit on the charging station in one orientation. It will be understood that the illustrated features and guides are merely illustrative and any suitable features and guides may be used to assist in positioning flying machine 200 in the proper location and orientation on the charging station.

Figure 3:
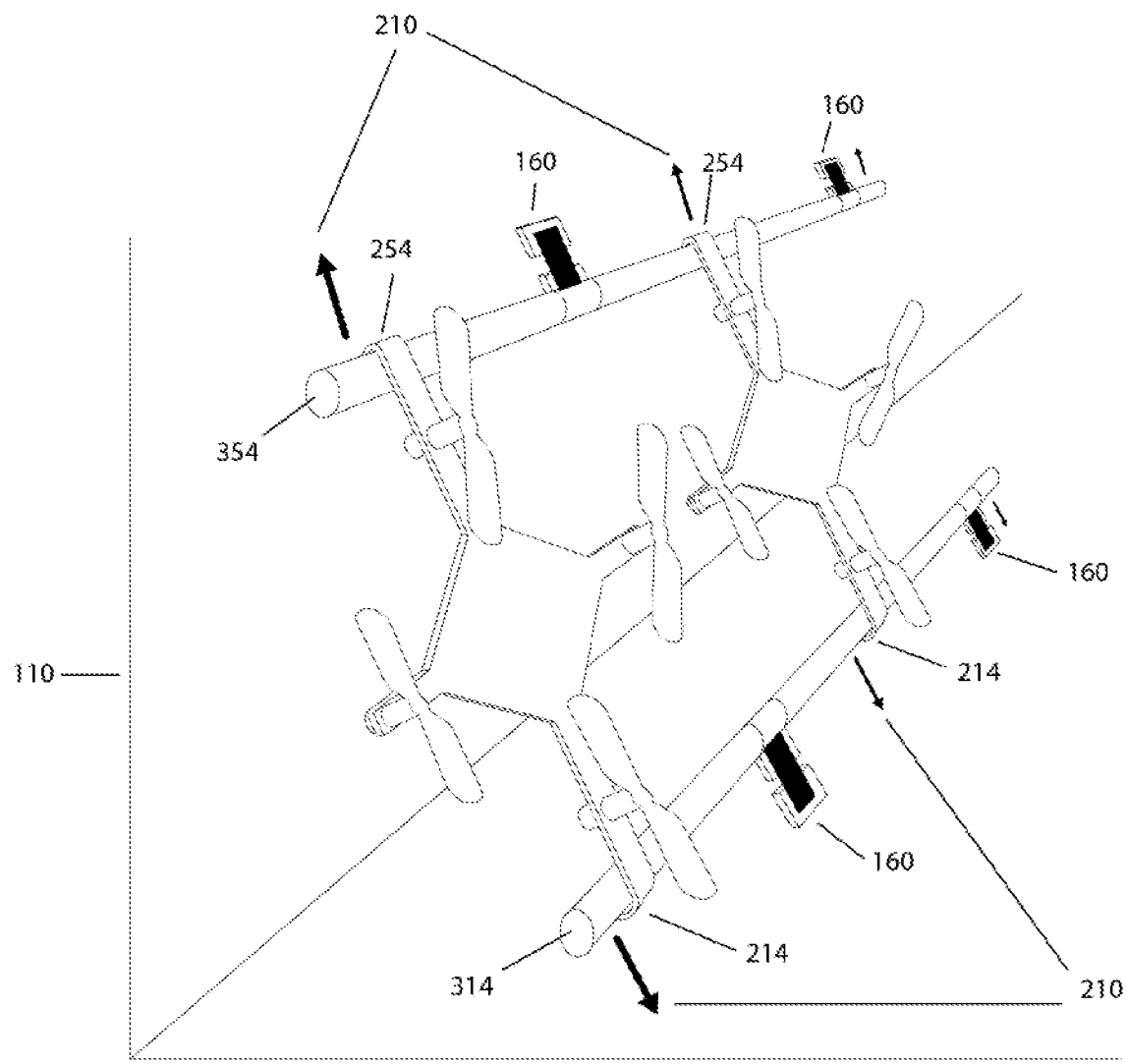
FIG. 3 shows an alternative system for charging and transporting flying machines in accordance with some embodiments of the present disclosure.

FIG. 3 shows an alternate system for charging and transporting a plurality of flying machines in accordance with some embodiments of the present disclosure. The system of FIG. 3 comprises two charging rods 314 and 354 as the charging container's terminals. Charging rods 314 and 354 also act as support structures. Charging rods 314 and 354 are used in the following way. One or more flying machines 200 are placed onto charging rods 314 and 354. This may be achieved manually or automatically (e.g., by landing the flying machines in the base 110). Flying machines 200 may include two hooks or other types of attachment mechanisms that are used to attach the flying machines to charging rods 314 and 354. As shown, each of flying machines 200 includes two hooks that at least partially surround a respective one of charging rods 314 and 354. They may be structured and arranged to support at least part of the weight of the flying machine when hanging from the hook. The two hooks comprise connectors 214 and 254. Accordingly, the hooks provide structural support as well as electrical connections for flying machines 200. Once the desired number of flying machines 200 are in base 110, a clamping mechanism 160 is used to spread charging rods 314 and 354, which applies opposing forces 210 to the hooks of flying machines 200. This fixates the flying machines' positions in the charging container. This also closes an electric circuit (e.g., simultaneously) (cabling omitted in figure for clarity). This is achieved by clamping the flying machines 200 between an upper charging rod 354 and a lower charging rod 314.

The hooks or other types of attachment mechanisms are preferably extensions of the flying machine's frame, with sufficient spacing to allow detachment of the hook from the rod. They may be structured and arranged to allow the flying machine to hang in a particular orientation. This may, for example, be achieved by using hooks made from material rigid enough to support the weight of the flying machine and by enabling attaching and detaching of the flying machine to and from the rod if a particular motion is performed. For example, the flying machine may be rotated along an axis to lift a hook free from a rod. As another example, the rod may be moved to release a flying machine.

The electric circuit allows charging of flying machines 200. This is achieved by connecting a charging module through charging rod 314, the first flying machine connector 214, the flying machine battery, a second flying machine connector 254, the charging rod 354, and back to the charging module (cabling and charging module omitted in figure for clarity). In some embodiments, each flying machine 200 includes a charging module and in these embodiments charging rods 314 and 354 provide power to the charging module.

It will be understood that the hook and the configuration shown in FIG. 3 are merely illustrative and any other suitable configuration or attachment mechanism can be used. For example, while the hooks are illustrated as being located at opposite ends of the body and extending from the rotor arms, the hooks can be positioned at any other suitable locations. For example, the hooks can be positioned under the rotor arms at any other suitable positions on the body of the flying machine. As another example, a magnet can be used to attach the flying machine to the charging rod. As another example, a pin can be used to attach the flying machine to the charging roof.

Figure 4:
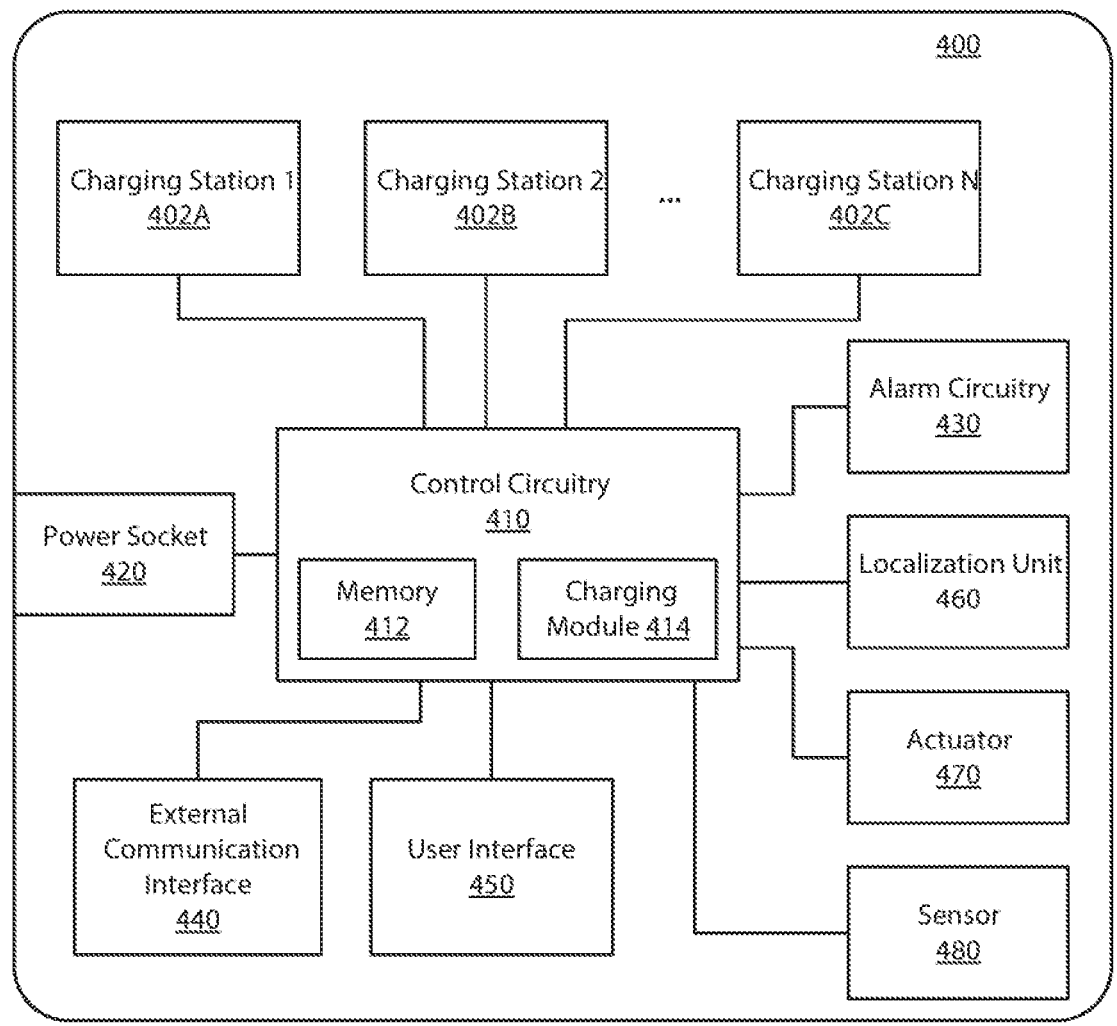
FIG. 4 shows a block diagram of illustrative electrical components of a charging container in accordance with some embodiments of the present disclosure.

FIG. 4 shows a block diagram of illustrative electrical components of a charging container 400 in accordance with some embodiments of the present disclosure. In some embodiments, charging container 400 corresponds to charging container 100 of FIGS. 1A-D. In some embodiments, base 110 of FIG. 3 can be used as part of charging container 400. Charging container 400 comprises charging stations 402A-C, control circuitry 410, power socket 420, alarm circuitry 430, communication interface 440, user interface 450, localization unit 460, actuator 470, and sensor 480.

Charging stations 402A-C may each comprise charging terminals (e.g., charging plates (see, e.g., FIGS. 1A-C), charging rods (see, e.g., FIG. 3), etc.) and a communication interface. The charging terminals may be configured for electrical coupling with electrical connectors of flying machines. Each of charging stations 402A-C may include two, three, four, or more charging terminals. For flying machines with a single cell battery, there may be only two charging terminals included as part of charging stations 402A-C. For flying machines with multicell batteries, additional charging terminals may be provided to enable battery balancing. The communication interface for each of charging stations 402A-C may be any suitable communication interface for enabling control circuitry 410 to communication with a flying machine docked in a charging station. In some embodiments, the communication interface may use any suitable communication protocol such as Bluetooth, ZigBee, or WiFi. In some embodiments, the communication interface may use a wired communication protocol between the flying machine and control circuitry 410. The wired communication may be established by connecting at least one communication terminal on the charging station with at least one communication connector on the flying machine. In some embodiments, the communication interface may communicate with the flying machines using the charging terminals. This may, for example, be achieved using a DC-BUS. While three charging stations are depicted in FIG. 4, any suitable number of charging stations may be included in charging container 400.

Localization unit 460 determines the location of charging container 400. Localization unit 460 may include a receiver and one or more antennas for receiving localization signals. In some embodiments, localization unit 460 determines the location based on the reception times of timestampable localization signals (e.g., ultra-wideband signals) and known locations of the transceivers that transmit the signals. A received signal may be timestamped based on a local clock signal. The location may be determined using any suitable computations such as TOA or TDOA computations. The determined location is provided to control circuit 410. In some embodiments, localization unit 460 is incorporate into control circuitry 410. In some embodiments, charging station 400 does not include localization unit 460.

In some embodiments, the localization unit determines distances to transceivers that transmit signals. This may be achieved using known techniques in the art. For example, the localization unit and the transceivers may have synchronized clocks, the signals can contain a time indicating when the signals are sent as timestamped by the transceivers before they are sent. When the localization unit receives the signals the timestamps on the signals are compared to the time which the localization unit has on its clock. This allows the localization unit to determine the time of flight of the signal, thus allowing it to determine the distance between the localization unit and each of the transceivers knowing that the each of the signals travelled at the speed of light. Another way to determine distance is to use the signal power. To do this, the strength of the signal as originally transmitted by each of the transceivers is known to the localization unit (e.g., stored in memory or is part of the transmitted signal). By measuring the strength of each of the signals received at the localization unit and using a Free-space Path Loss model, the distances between the localization unit and each of the transceivers can be estimated. In yet a further example the localization unit can determine its position by triangulation. The localization unit receives signals from at least three transceivers and estimates the distance to each of the three transceivers based on the received signals (e.g., based on the strength of the receiving signals). Knowing the locations of these three transceivers (e.g., stored in memory or part of the transmitted signal), the localization unit determines its location based on the estimated distance it is from each of the three transceivers.

Control circuitry 410 can be implemented using any suitable hardware or combination of hardware and software. For example, control circuitry may include one or more processors, memory such as non-transitory computer readable memory, one or more software modules comprising computer-readable instructions, firmware, or any combination thereof.

Actuator 470 can be any suitable actuator to assist in the operation of charging container 400. In some embodiments, actuator 470 operates the clamping mechanisms or functions as a clamping mechanism that is used to secure the flying machines for charging and/or transport. For example, lid 150 of FIGS. 1A-D may be connected to a corresponding base 110 with a hinge along one side and actuator 470 may be a linear or rotary actuator that is used to raise lid 150. Suitable actuators may include servomotors or stepper motors. In some embodiments, one or more actuators 470 can be used to individually secure and release the flying machines. Actuator 470 is controlled by control circuitry 410. In some embodiments, actuator 470 is only operated when charging container 400 is in an appropriate location as determined by localization unit 460. In some embodiments, charging station 400 does not include actuator 470.

Sensor 480 may be any suitable sensor or combination of sensors. For example, sensor 480 may include one or more of an optical sensor, an accelerometer, a magnetometer, and a gyroscope. In some embodiments, control circuitry 410 uses measurements from sensor 480 to control operation of charging container 400. For example, control circuity 410 can use the measurements to determine whether charging container 400 is in a proper orientation and sufficiently level to release and receive flying machines. This may, for example, be achieved by equipping the flying machine with an appropriate sensor such as an accelerometer or a magnetometer. In some embodiments, sensor 480 is used to determine whether a flying machine is positioned at each charging station. This may, for example, be achieved using a Hall sensor, optical sensor, current sensor, or displacement sensor. In some embodiments, charging station 400 does not include sensor 480.

Figure 5:
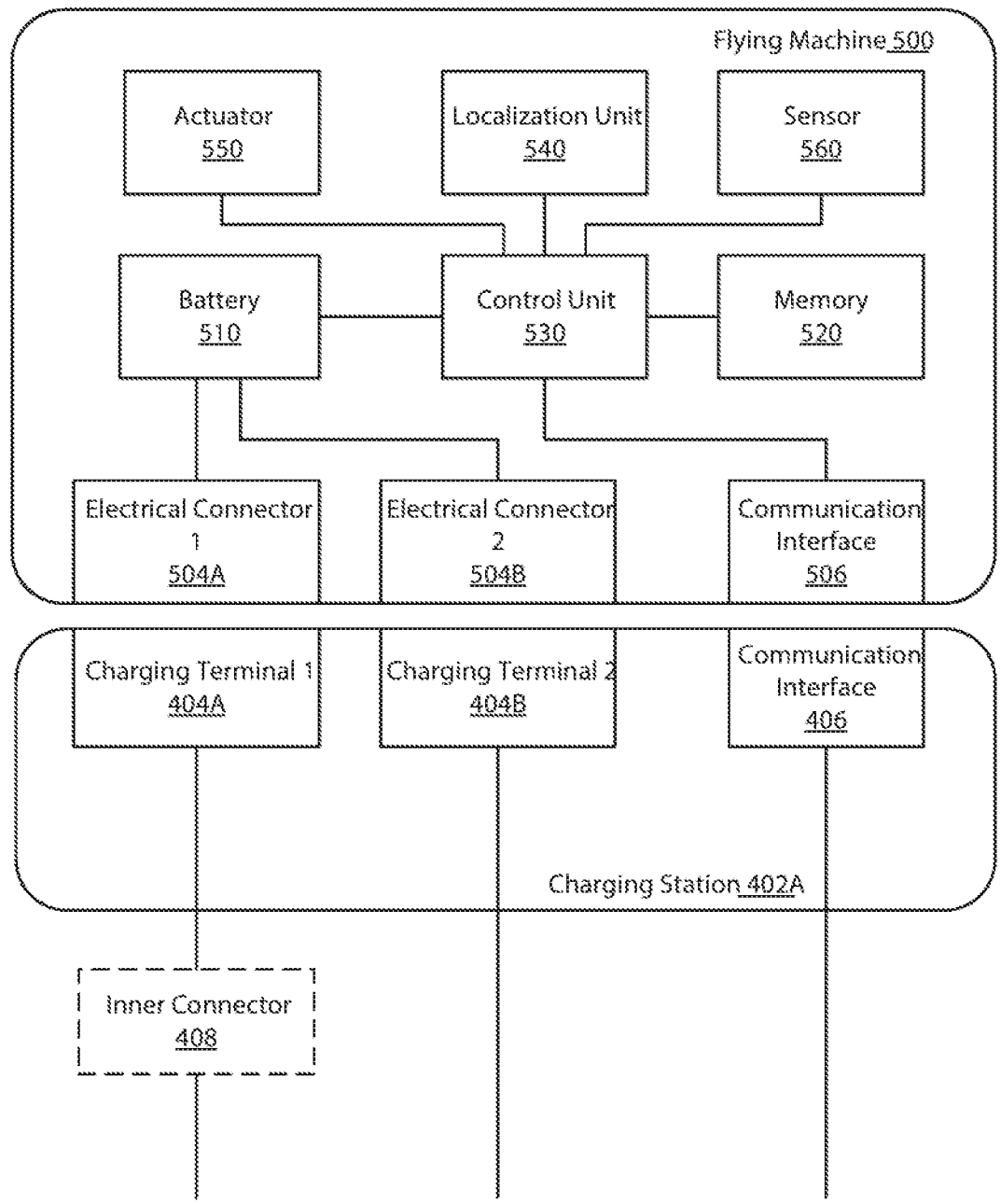
FIG. 5 shows a block diagram of illustrative electrical components of a charging station and a flying machine in accordance with some embodiments of the present disclosure.

FIG. 5 shows a block diagram of illustrative electrical components of charging station 402A of FIG. 4 and a flying machine 500 in accordance with some embodiments of the present disclosure. As illustrated in FIG. 5, charging station 402A here includes two charging terminals, charging terminals 404A and 404B. Charging terminals 404A and 404B are capable of being electrically coupled with respective electrical connectors 504A and 504B of flying machine 500. In some embodiments, terminals 404A and 404B and connectors 504A and 504B are electrically conductive and the electrical coupling is achieved by physical contact. As discussed above, a clamping mechanism may be used to ensure good physical contact. Additionally or alternatively, a magnet may be used to ensure good physical contact. For example, one or more of charging terminals 404A and 404B and electrical connectors 504A and 504B may comprise a permanent magnet or an electromagnet. In some embodiments, the pull force of the magnet may be sufficiently high to ensure good physical contact, but less than the force flying machine 500 is capable of generating for lifting off of charging station 402A. When the magnet is an electromagnet, which is capable of being turned on and off, the pull force may set to be high enough to physically fixate flying machine 500 to charging station 402A. The electromagnet may be turned off to enable flying machine 500 to lift off of charging station 402A. The foregoing examples are merely illustrative and any suitable magnetic pulling force may be used in accordance with the present disclosure. In some embodiments, terminals 404A and 404B and connectors 504A and 504B comprise induction coils and are inductively coupled to each other to enable inductive charging. In one example, terminals 404A and 404B comprise relatively large inductive coils and connectors 504A and 504B comprise relatively small inductive coils. By using larger inductive coils or power at terminals 404A and 404B, the inductive coils on flying machine 500 may be dimensioned smaller and thus reduce weight for flying machine 500. Connectors 504A and 504B are electrically coupled to battery 510 to enable charging of the battery. It will be understood that additional charging terminals and corresponding electrical connectors may be provided to enable charge balancing of battery 510.

Charging station 402A of FIG. 5 also includes communication interface 406 and flying machine 500 also includes a corresponding communication interface 506. Interfaces 406 and 506 may be any suitable wired or wireless communication interfaces to enable communication between flying machine 500 and charging station 402A. Examples of wireless communication interfaces that may be used include Bluetooth, ZigBee, and WiFi. Communication interface 506 of flying machine 500 may be coupled to memory 520 through control unit 530. Memory 520 may be any suitable non-transitory computer readable memory. Memory 520 may store computer-readable instructions that are executable by processing circuitry (e.g., control unit 530). Memory 520 may also store information about flying machine 500. For example, memory 520 may store an ID number for flying machine 500, battery information about battery 510, and flight plan information for flying machine 500. The battery formation may include battery voltage, the number of battery cells, battery capacity, battery charge history, any other suitable battery information and any combination thereof. The information stored in memory 520 may be communicated to a charging container via communication interfaces 506 and 406. It will be understood that a wired communication interface may use separate wires or may use one or more wires in common with charging terminals 404A and 404B. For example, a wired communication interface may communicate over charging terminals 404A and 404B using DC-BUS technology.

FIG. 5 also shows inner connector 408. In connector 408 can be used, for example, when charging terminals 404A and 404B of charging station 402A are located on different components of a charging container. For example, when charging station 402A corresponds to a charging station of FIGS. 1A-D and one charging terminal is located on base 110 and the other charging terminal is located on lid 150, inner connector 408 can be used to form an electrical coupling between base 110 and lid 150. When charging terminals 404A and 404B of charging station 402A are located on, for example, a single structure, inner connector 408 is not needed.

FIG. 5 also shows flying machine 500 as also including localization unit 540, actuator 550, and sensor 560. Localization unit 540 computes the location of flying machine 500. In some embodiments, localization unit 540 includes the functionality and components of localization unit 460 as described above. Localization unit 540 provides the determined location to control unit 530. In some embodiments, localization unit 540 is incorporated into control unit 530. In some embodiments, flying machine 500 does not include localization unit 540.

Control unit 530 can be implemented using any suitable hardware or combination of hardware and software. For example, control unit 530 may include one or more processors, memory such as non-transitory computer readable memory, one or more software modules comprising computer-readable instructions, firmware, or an combination thereof.

Actuator 550 can be any suitable actuator for controlling the motion of flying machine 500. For example, actuator 550 can be a motor coupled to a propeller. Actuator 550 may comprise a single motor (e.g., for a fixed wing aircraft) or multiple motors (e.g., for a multicopter). Actuator 550 is controlled by control unit 530. In some embodiments, flying machine 500 is capable of autonomous flight and control unit 530 determines one or more control signals that are provided to actuator 550. In some embodiments, the one or more control signals are used to vary the thrust produced by or more propellers that are coupled to one or more actuators 550. In some embodiments, control unit 530 determines the one or more control signals to cause flying machine 500 to follow a desired flight path. In some embodiments, control unit 530 uses one or more control loops to determine the one or more control signals based on a reference signal. In some embodiments, control unit 530 compares the current position of flying machine 500 to a reference position associated with the flight path.

Sensor 560 may be any suitable sensor or combination of sensors. For example, sensor 560 may include one or more of an optical sensor, radio frequency (RF) sensor, a Hall effect sensor, an accelerometer, a magnetometer, and a gyroscope. In some embodiments, control unit 530 uses measurements from sensor 560 to control operation of flying machine 500. For example, control unit 530 can use measurements from an optical sensor (e.g., a vision sensor) to detect a well-defined feature on a base 110 to assist in landing at a charging station. For example, the measurements from the optical sensor can be used to determine the relative position of flying machine 500 to the well-defined feature and this information can be used to execute a landing or docking sequence. This may, for example, be achieved by using a fiducial with a known size and location on the base 110 and a calibrated camera on the flying machine to provide relative distance (size of fiducial on the camera sensor) and parallel displacement (position of the fiducial on the camera sensor) between the fiducial marker and the flying machine. In some embodiments, sensor 560 can be used to identify the charging station at which flying machine 500 is positioned. This may, for example, be achieved using a Hall sensor, optical sensor, current sensor, or displacement sensor. Flying machine 500 can provide the identity of the charging station to charging container 400 using communication interface 506. In some embodiments, flying machine 500 does not include sensor 560.

It will be understood that the details of FIG. 5 and the corresponding description are not limited to charging station 402A. The details and corresponding description also apply to charging stations 402B and 402C of FIG. 4 and the other charging stations described herein.

Referring back to FIG. 4, control circuitry 410 may include memory 412 and a charging module 414. Control circuitry 410 may communicate with and control the operation of the electrical components of charging container 400. For example, control circuitry 410 may detect the presence of a docked flying machine in each of charging stations 402A-C (e.g., using one or more sensors 480) and enable charging of the docked flying machines. Memory 412 may be any suitable non-transitory computer readable memory. Memory 412 may store computer-readable instructions that are executed by control circuitry 410. Memory 412 may also store information about charging status and charging history, information received from flying machines, information received from user interface 450, any other suitable information, and any suitable combination thereof. Charging module 414 charges flying machines docked at charging stations 402A-C. Charging module 414 may operate under the control of control circuitry 410 and may be configured to independently control the charging at each of charging stations 402A-C. In some embodiments, charging module 414 is configured to perform passive or active battery balancing. While charging module 414 is shown as being separate from control circuitry 410, in some embodiments the functionality of charging module 414 may be integrated into control circuitry 410, or vice-versa. In some embodiments, charging station 400 does not include charging module 414. For example, each flying machine may include a charging module.

Alarm circuitry 430 may include any suitable audible or visual indicators for indicating an alarm condition. Alarm conditions include, for example, completion of charging, battery failure, battery overheating, poor connection with a flying machine, any other suitable alarm conditions, and any combination thereof. As an example, charging module 414 may sense the temperature of batteries being charged and if the temperature of a battery exceeds a threshold (e.g., a normal charging temperature), alarm circuitry 430 may activate an alarm. In some embodiments, charging station 400 does not include alarm circuitry 430.

Power socket 420 may correspond to power socket 122 of FIGS. 1A, 1C, and 1D. Power socket 420 may be configured to physically and electrically connect to a removable external power cable, which can be connected to a power source such as an electrical outlet. In some embodiments, power socket 420 may include a power cable (e.g., a retractable power cable) for connection to a power source.

User interface 450 may include a user input device, a display, or a speaker. Any type of user input device may be included as part of user interface 450, such as a keyboard, a mouse, a touch screen, buttons, switches, a microphone, a joy stick, a touch pad, or any other suitable input device. For example, user interface 450 may include power switch 124 of FIGS. 1A, 1C, and 1D. Any type of display may be included as part of user interface 450, such as a cathode ray tube display, a flat panel display such as a liquid crystal display or plasma display, or any other suitable display device. The display may display, for example, menu options and softkeys may be provided to enable a user to control the operation of charging container 400. As another example, the display may display the status of each of charging stations 402A-C. The status may indicate whether a flying machine is docked at a charging station, whether a battery is being charged, charging voltage, charging current, expected charging time, battery identifier, battery health status, whether a battery is fully charged, etc.

User interface 450 may enable the user to control various aspects of charging container 400. For example, a user may use user interface 450 to initiate charging of flying machines docked in respective charging stations. As another example, a user may use user interface 450 to retrieve information from docked flying machines. As another example, a user may use user interface 450 to program or adjust software or settings of flying machines.

External communication interface 440 may enable charging container 400 to communicate with external devices. External communication interface 440 may include any suitable hardware or hardware and software, which may allow charging container 400 to communicate with electronic circuitry, a device (e.g., a laptop or smartphone), a network, a server or other workstations, a display, or any combination thereof. External communication interface 440 may include one or store receivers, transmitters, transceivers, antennas, plug-in connectors, ports, communications buses, communications protocols, device identification protocols, any other suitable hardware and software, or any combination thereof. External communication interface 440 may be configured to allow wired communication, wireless communication, or both. In some embodiments, some or all of user interface 450 may not be included in charging container 400 and the functionality may be implemented in an external device that communicates with charging container 400 using external communication interface 440. In some embodiments where multiple charging containers are used, a single external device (e.g., a laptop) may be used to control multiple charging containers through their respective external communication interfaces. In some embodiments, charging station 400 does not include external communication interface 440.

Figure 6:
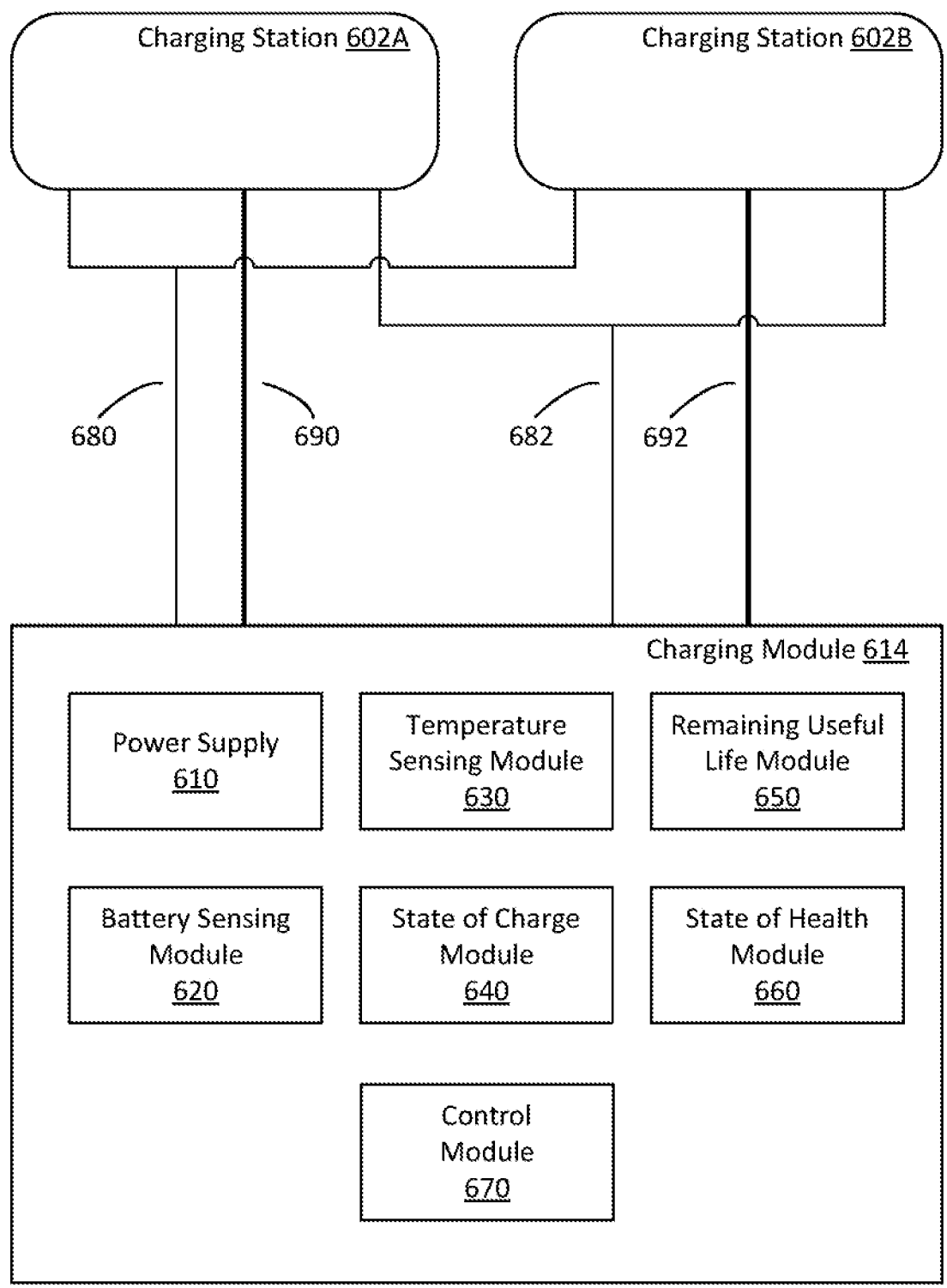
FIG. 6 shows a block diagram of a charging module and its interconnection with two charging stations in accordance with some embodiments of the present disclosure

FIG. 6 shows a block diagram of charging module 614 and its interconnection with charging stations 602A and 602B in accordance with some embodiments of the present disclosure. In some embodiments, charging module 614 corresponds to charging module 414 of FIG. 4 and charging stations 602A and 602B correspond to two of the charging stations of FIG. 4. Charging module 614 is connected to charging station 602A by connectors 680, 682, and 690. Charging module 614 is connected to charging station 602B by connectors 680, 682, and 692. Connector 680, 682, 690, and 692 may be any suitable wired connections for providing communication between charging module 614 and charging station 602A and 602B.

Charging module 614 may provide a constant or variable voltage or current to charging stations 602A and 602B to charge batteries of docked flying machines using connectors 680 and 682 and power supply 610. While connectors 680 and 682 are shown as being connected to multiple charging stations, it will be understood that other configurations can be used. For example, separate connectors can be used for each charging station. As another example, switches can be used in connectors 680 and 682 to enable independent control of each charging station. In some embodiments, charging module 614 uses connectors 690 and 692 to monitor and control the charging of docked batteries (e.g., battery balancing). In some embodiments, connectors 690 and 692 may each include multiple wired connections.

Charging module 614 may include battery sensing module 620, temperature sensing module 630, state of charge (SOC) module 640, remaining useful life (RUL) module 650, state of health (SOH) module 660, and control module 670. Battery sensing module 620 may be configured to detect when a flying machine is docked at a charging station. For example, battery sensing module 620 may check the resistant, voltage, or current across two connectors of a charging station to detect the presence of a flying machine. Temperature sensing module 630 may be configured to detect the temperature of a docked battery. In some embodiments, temperature sensing module 630 may be configured to detect multiple temperatures of a docked battery (e.g., one for each battery cell). Temperature sensing module 630 may determine the temperature of the battery using any suitable technique or combination of techniques. For example, the temperature may be estimated based on the charging history and a model of the temperature behavior of the battery. As another example, the temperature may be determined by measuring the impedance of the battery. As another example, the temperature may be determined using a thermistor. In addition, any other technique or combination of techniques may be used to determine one or more temperatures of a battery.

SOC module 640 may be configured to determine the available capacity of a battery. In some embodiments, SOC module 640 may be configured to determine the available capacity of each cell of the battery. The available capacity of the battery may be determined using any suitable technique. Charging module 614 may use the capacity information in order to perform battery balancing.

RUL module 650 may be configured to determine the remaining useful life. RUL module 650 may determine the remaining useful life using any suitable technique. For example, the remaining useful life may be determined by monitoring the battery while it is being charged. As another example, the battery or the flying machine may have a unique ID number and RUL module 650 may use historical charging information to determine the regaining useful life. When the remaining useful life is less than a predetermined amount, charging module 614 may trigger an alarm or display a warning to an operator.

SOH module 660 may be configured to determine the general condition of a battery. In some embodiments, the general condition is determined in comparison to a new battery or an ideal condition for that type of battery. For example, SOH module 660 could measure the impedance of the battery and compare the measurement to the impedance typically achieved by new batteries. As another example, SOH module 660 could measure the capacity of the battery by performing a full discharge and charge cycle of the battery and compare the measurement to the nominal capacity of the battery. SOH module 660 may display the condition of the battery for an operator. In some embodiments, the condition of the battery is used by RUL module 650 to determine the remaining useful life.

Control module 670 may be configured to determine the appropriate constant or variable voltage or current for charging stations 602A and 602B to charge batteries of docked flying machines using connectors 680 and 682, and power supply 610. In addition to charging, control module 670 may be configured to balance the batteries, or perform special functions such as regulating the battery to a specific SOC (e.g., a SOC suitable for transport or storage). In other embodiments, the control module may be physically located on the flying machine.

It will be understood that while charging module 614 has been described as including several different modules, not all of the modules need to be included. For example, in a basic implementation, modules 620-670 may not be included as part of charging module 614.

Charging module 614 may be configured to maximize the useful life of the batteries and charge the batteries in a safe manner. For example, the charging current or voltage may be intelligently ramped up at the start of charging. As another example, a current limiter or surge protection may be used to prevent the batteries from overheating. As another example, fuses may be included as part of the connectors or in the batteries to prevent too much current from entering the battery and protect the batteries from a short circuit. Any other safety techniques and combinations of safety techniques may be included in charging module 614.

While charging module 614 has been described as being connected to charging stations 602A and 602B, in some embodiments a separate charging module 614 may be physically located on each flying machine. In such embodiments, each charging station may provide power to the flying machine in order to power charging module.

It will be understood that while the containers described above include charging capability and are referred to as charging containers, in some embodiments the containers may not include charging capability. It will be also understood that the containers described herein can be referred to as storage containers or flying machine storage containers. It will also be understood that while the containers described above include clamping mechanisms that mechanically fixate the flying machines to the containers, in some embodiments the containers may not include clamping mechanisms.

Figure 7:
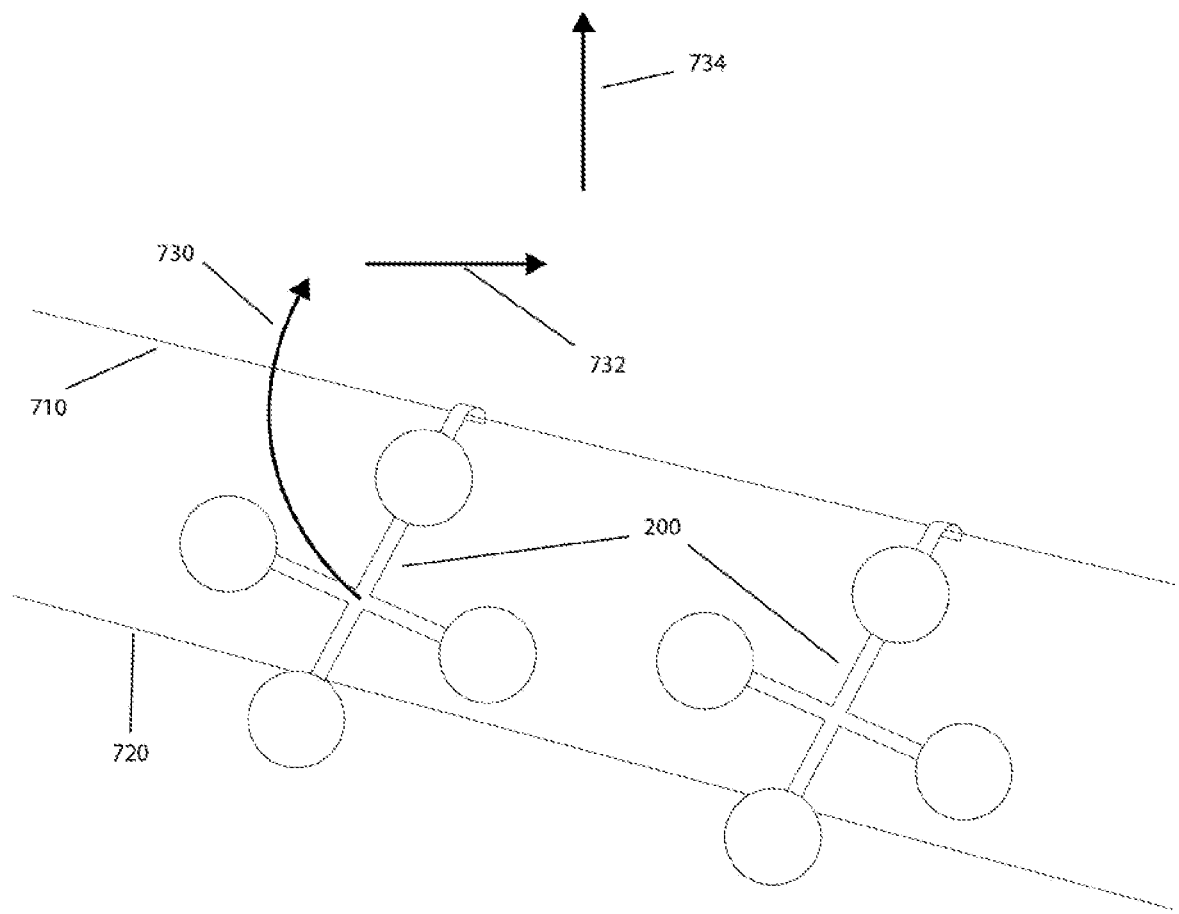
FIG. 7 shows illustrative flying machines hanging from a cable in accordance with some embodiments of the present disclosure.

The flying machines of the present disclosure can be used to perform various methods and can be configured to perform various methods. In some embodiments, the flying machines of the present disclosure can be configured to launch from a hanging position. For example, flying machines 200 of FIG. 3 can be configured to take off while hanging from charging rod 354. In addition, FIG. 7 shows flying machines 200 hanging from an upper cable 710 and resting on a lower cable 720 in accordance with some embodiments of the present disclosure. Upper cable 710 can be any suitable support structure from which flying machines 700 can hang. For example, upper cable 710 can be a cable, rod, or other support structure having one or more features from which flying machines 200 can hang. In some embodiments, cables 710 and 720 may be strung across a stage (e.g., either out of view or as part of the set). Lower cable 720 can vertically offset from upper cable 710 to maintain flying machines 200 at a particular angle with respect to vertical (e.g., at a 45 degree angle). In some embodiments, flying machines 200 of FIG. 7 each include a single hook that at least partially surrounds upper cable 710 to enable hanging, where gravity causes the flying machine to rest upon lower cable 720. In some embodiments, flying machines 200 of FIG. 7 may include two hooks similar to flying machines 200 of FIG. 2. In some embodiments, cables 710 and 720 may be used as charging terminals and/or to provide data communication with flying machines 200. In some embodiments, cables 710 and 720 can be moved and used similar to a laundry line system. For example, flying machines can be positioned on cables 710 and 720 by placing a flying machine on the cables, moving cables 710 and 720, and sequentially repeating the process. In some embodiments, cables 710 and 720 have special sections on which flying machines are to be mounted to enable electrical connection for communication and/or charging.

In some embodiments, a flying machine configured to launch from a hanging position (e.g., as illustrated in FIGS. 3 and 7) comprises a body, at least two actuators and corresponding propellers coupled to the body, and an attachment component coupled to the body, which is configured to engage a support structure, thereby enabling the flying machine to hang from the support structure in a first orientation. The flying machine further comprises a receiver coupled to the body, which is configured to receive localization signals, and a sensor coupled to the body, which is configured to generate an orientation signal. The flying machine further comprises at least one processor coupled to the body, where the at least one processor is configured to (a) receive a launch command, (b) execute a first launch maneuver in response to receiving the launch command while the flying machine is hanging from the support structure in the first orientation, where the first launch maneuver activates at least one of the at least two actuators and corresponding propellers to cause the flying machine to rotate about the support structure from the first orientation to a second orientation, (c) determine the completion of the first launch maneuver based on the orientation signal, and (d) execute a second launch maneuver in response to determining the completion of the first launch maneuver, where the second launch maneuver activates at least two of the at least two actuators and corresponding propellers to cause the flying machine to disengage the support structure and lift off, and where the second launch maneuver is controlled based on the localization signals.

In some embodiments, a successful launch may require three launch maneuvers. The three maneuvers are illustrated in FIG. 7 with movement arrows 730, 732, and 734. The first launch maneuver moves the flying machine into an upright position as illustrated by movement arrow 730. The second launch maneuver moves the flying machine sideways as indicated by movement arrow 732. The third launch maneuver moves the flying machine upwards for takeoff as illustrated by movement arrow 734. In some embodiments, the mechanical structure of the hook on the flying machine mechanically prevents flying machines that cannot perform these maneuvers (e.g., because of miscalibration, failure to spin up a motor, etc.) from taking off.

In some embodiments, a flying machine is configured to land on and hang from a support structure (e.g., charging rod 354 of FIG. 3 or upper cable 710 of FIG. 7), which may comprise one or more charging terminals. The flying machine may comprise a body, at least one actuator and corresponding propeller coupled to the body, and an attachment component coupled to the body, where the attachment component is configured to engage a support structure, thereby enabling the flying machine to hang from the support structure in a particular orientation. The flying machine may further comprise a receiver coupled to the body, where the receiver is configured to receive localization signals, and a sensor coupled to the body, where the sensor is configured to generate an orientation signal. The flying machine may further comprise at least one processor coupled to the body, wherein the at least one processor is configured to (a) receive a docking command, (b) execute a first docking maneuver in response to receiving the docking command, where the first docking maneuver causes the flying machine to fly to a predetermined position relative to the support structure using the at least one actuator and corresponding propeller and the localization signals, (c) execute a second docking maneuver after completion of the first docking maneuver, where the second docking maneuver causes the flying machine to contact the support structure, and (d) execute a third docking maneuver after completion of the second docking maneuver, where the third docking maneuver causes the flying machine to rotate about the support structure to engage the support structure with the attachment component, where the flying machine is hanging from the support structure in the particular orientation after completion of the third docking maneuver, and where the third docking maneuver is controlled based on the orientation signal.

In some embodiments, a method for charging a plurality of flying machines may be performed in accordance with the present disclosure. The method comprises (a) maneuvering a first flying machine to a pre-docking position, (b) executing a first docking maneuver, (c) maneuvering a second flying machine to a pre-docking position, (d) executing a second docking maneuver, (e) maneuvering a third flying machine to a pre-docking position, and (f) executing a third docking maneuver. The method may further comprise (g) engaging a mechanical clamping mechanism and thereby fixating at least the first, second, and third flying machines. The method further comprises (h) initiating charging of at least the first, second, and third flying machines. The method may further comprise (i) releasing the mechanical clamping mechanism and thereby simultaneously releasing the at least first, second, and third flying machines.

In some embodiments, a method for connecting a plurality of flying machines to a charger may be performed in accordance with the present disclosure. Each of the plurality of flying machines may comprise at least first and second connectors and the charger may comprise at least a first and a second charging and transporting means, where the first connector is structured and arranged to create a first electrical and mechanical connection to the first charging and transporting means and the second connector is structured and arranged to create a second electrical and mechanical connection to the second charging and transporting means. The method comprises (a) autonomously maneuvering each of the plurality of flying machine such that each flying machine's first connector is in contact with the first charging and transporting means, and (b) manually manipulating the plurality of flying machines or the charger to ensure contact between each of the flying machine's second connector and the second charging and transporting means. The method may further comprise (c) engaging a clamping mechanism to establish an electrical and mechanical connection between each of the plurality of flying machines and the charger.

In some embodiments, a method for docking a plurality of flying machines to a charger may be performed in accordance with the present disclosure. The charger may comprise a base, at least one well defined feature at a well-defined position on the base, first and second charging terminals, and charging circuitry operationally connected to the charging terminals. Each of the plurality of flying machines may comprise (a) a body, (b) a battery attached to the body, (c) first and second connectors attached to the body, each structured and arranged to simultaneously provide a mechanical connection with the body and an electrical connection with the battery, and each further structured and arranged to allow for a mechanical and an electrical connection with the first or second charging terminal, (d) a sensor attached to the body and operational to detect the at least one well defined feature and to produce data representative of a motion of the flying machine relative to the well-defined feature, and (e) an actuator attached to the body and operational to produce a force that can cause the flying machine to fly. The method comprises initiating a flying machine docking maneuver with the charger and in response to the initiating of the flying machine docking maneuver carrying out the following steps: (a) computing an estimate of a relative position of the flying machine to the well-defined feature based on the data representative of the motion of the flying machine relative to the well-defined feature, (b) controlling the actuator based on a comparison of the estimate of a relative position of the flying machine to the well-defined feature with a desired relative position of the flying machine to the well-defined feature, and further based on the known well defined position on the base, and (c) detecting at least a first docking between the first or second connector and the first or second charging terminal. The method further comprises, in response to the detecting of at least a first docking, carrying out the following steps: (a) terminating the flying machine docking maneuver, and (b) enabling the charger's charging circuitry.

In some embodiments, a method for autonomous take off of a plurality of flying machines from a charger may be performed in accordance with the present disclosure. The charger comprises a plurality of charging stations, where each charging station comprises: (a) at least first and second charging terminals, (b) a guide, structured and arranged to mechanically or magnetically assist in maintaining a flying machine in a desired position and orientation for take off, and (c) charging circuitry operationally connected to the first and second charging terminals. Each of the plurality of flying machines comprises: (a) a body, (b) a battery attached to the body, (c) at least first and second connectors, each attached to the body, and each structured and arranged to allow electrical contact with respective first and second charging terminals of a charging station when docked with that charging station, (c) an actuator attached to the body and operational to produce a force that can cause the flying machine to take off, and (d) a communication interface, structured and arranged to receive a signal triggering the flying machine's take off from its charging station. The method comprises initiating take off of at least a first of the plurality of flying machines from the charger and, in response to the initiating of the first flying machine take off maneuver, carrying out the following steps: (a) receiving a take off signal at the first flying machine's communication interface, (b) comparing the flying machine's battery charge to a predefined threshold (e.g., a safety threshold), and (c) in dependence of the comparing the first flying machine's battery charge to the threshold, executing or aborting the take off maneuver of the first flying machine from the charging station.

In some embodiments, systems and methods are provided for ensuring that flying machines have sufficient performance capability for taking off. In some embodiments, the system comprises a mechanical structure that requires a flying machine to perform one or more maneuvers in order to be released from its launch position. For example, the system may comprise first and second regions that constrain the positioning of a flying machine within the regions. The system may further comprise a transition region (e.g., a choke point) that enables a flying machine to move from the first region to the second region. The system may further comprise an exit within the second region that enables the flying machine to exit the second region.

In some embodiments, the mechanical structure comprises one or more mechanical guides that restrict movement of a flying machine in one or more degrees of freedom and allow movement of the flying machine in one or more different degrees of freedom. The one or more mechanical guides may form a labyrinth that a flying machine needs to navigate in order to be released.

Figure 8A:
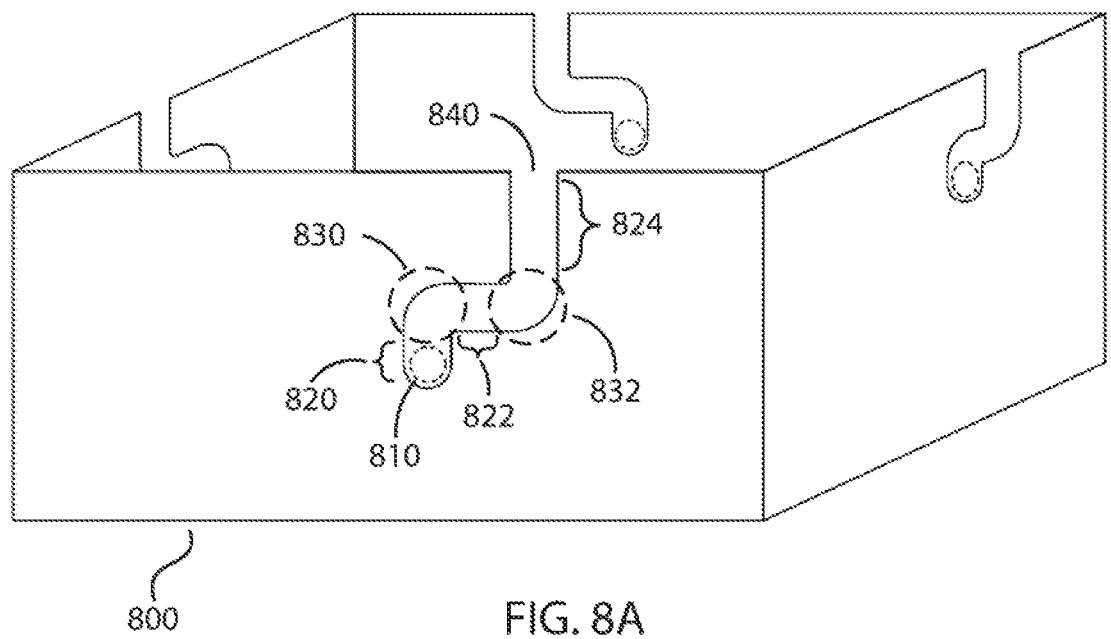
FIG. 8A shows illustrative a mechanical labyrinth structure in accordance with some embodiments of the present disclosure.
Figure 8B:
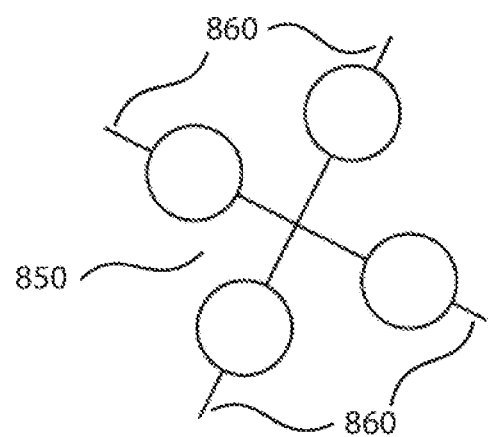
FIG. 8B shows an illustrative flying machine having protrusions for interacting with a mechanical labyrinth structure in accordance with some embodiments of the present disclosure.

FIG. 8A shows an illustrative mechanical labyrinth structure 800 in accordance with some embodiments of the present disclosure. As shown, structure 800 comprises four sides. Each side comprises an open region forming a passageway through which a portion of a flying machine may pass. As shown, the passageway on each side of structure 800 has the same shape. In some embodiments, the shape and/or size of the passageway of one or more sides of structure 800 may be different (e.g., asymmetrical). FIG. 8B shows an illustrative flying machine 850 having protrusions 860 that extend from each of the four rotor arms of the flying machine body. Each protrusion 860 may be sized to pass through a passageway on a side of structure 800. When flying machine 850 is fully inserted into structure 800, each protrusion 860 may come to rest at the bottom of a passageway as shown by circle 810. In order for a flying machine such as flying machine 850 to launch, it must first lift up from the bottom of the passageway, through region 820 to reach the height of region 820. The flying machine must then move the protrusion sideways to pass through horizontal region 820 to be Vertically aligned with vertical region 824. The flying machine must then lift up to pass through vertical region 824 to reach exit 840. Transition regions 830 and 832 enable the flying machine to pass between adjacent vertical and horizontal regions. Vertical regions 820 and 824 comprise mechanical guides (e.g., the sides of the passageway) that limit movement of the flying machine in the horizontal degree of freedom and allow movement in the vertical degree of freedom. When more than one side of structure 800 has similar vertical regions (e.g., opposite sides), the regions also act to limit movement of the flying machine in a rotational degree of freedom about a vertical axis. Horizontal region 822 comprises a mechanical guide (e.g., the sides of the passageway) that limit movement of the flying machine in the vertical degree of freedom and allows movement in the horizontal degree of freedom. When more than one side of structure 800 has similar horizontal regions (e.g., opposite sides), the regions also act to limit movement of the flying machine in a rotational degree of freedom about a horizontal axis. Transition regions 830 and 832 may each allow movement of the flying machine in the degrees of freedom restricted by its adjacent regions.

The passageways in the sides of structure 800 require a flying machine to perform particular sequence of maneuvers in order for the flying machine to be released from the structure. The structure may therefore be considered to create an obstacle course or a labyrinth that the flying machine needs to successfully navigate to be released from the structure. When a flying machine is programmed to perform an autonomous or semiautonomous flight, structure 800 provides a mechanical test of the flying machine's performance capabilities to ensure that the flying machine has sufficient performance capabilities for the flight. If a flying machine does not have sufficient performance capability, it may not be able to successfully navigate the passageways to be released.

It will be understood that the shape of the passageways depicted in FIG. 8A are merely illustrative and any suitable shapes and combination of shapes can be used to create a mechanical test of a flying machine's performance capability. For example, a stricter performance test may use additional regions to form a more complex shaped passageway. In addition, the passageway may include one or more dead-end branches that the flying machine needs to successfully navigate past to reach the exit. For example, a dead-end region may be added to the right of transition region 832. If a flying machine moves too far to the right through transition region 832, it would enter the dead-end region and will not be able to reach the exit. Structure 800 may also include one or more active elements. For example, a safety off switch may be included so that if a flying machine moves or rotates too much it activate the switch. The switch may, for example, cause a signal to be transmitted to the flying machine instructing the machine to shut down. As another example, the switch may activate a latch or other mechanism to prevent the flying machine from being released from the structure. In some embodiments, a safety off switch may be included on the flying machine.

In some embodiments, structure 800 may be positioned around a charging station such as any of the charging stations depicted in FIGS. 1A, 1D, 2A, 2C, and 2D. In some embodiments, structure 800 may be used in connection with any suitable flying machine launching pad or take off position. It will also be understood that while structure 800 releases a flying machine from its top, structure 800 can be positioned in any other suitable orientation to launch flying machines. In some embodiments, the openings in the sides of structure 800 may be on the bottom to enable a flying machine to exit from the bottom of structure 800. In these embodiments, structure 800 may be attached to the underside of a support structure. It will also be understood that structure 800 may interact with any suitable part or parts of flying machine 200. In some embodiments, one of more abutments located at any suitable locations on the body of flying machine 200 may be used to interact with the passageways of structure 800. In some embodiments, the rotor arms of flying machine 200 may be shaped and sized to interact with the passageways of structure 800.

In some embodiments, the mechanical structure of the present disclosure comprises two more regions that are sized larger than the flying machine. Each region may constrain the positioning of the flying machine so that it can fly within a defined space. The mechanical structure also comprises a transition region that enables the flying machine to pass between two regions. The transition region may function as a choke point that the flying machine must successfully navigate through to pass between regions.

Figure 9:
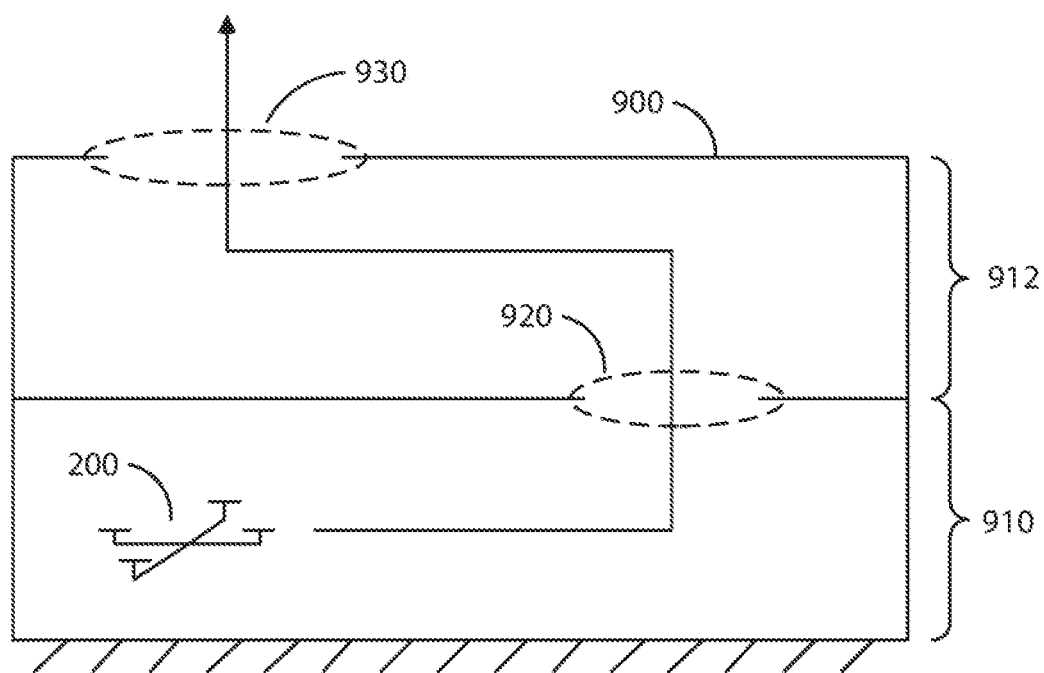
FIG. 9 shows a mechanical structure having two regions and a transition region in accordance with some embodiments of the present disclosure.

FIG. 9 shows a mechanical structure 900 in accordance with some embodiments of the present disclosure. Mechanical structure 900 comprises a first region 910 and a second region 912. Regions 910 and 912 are sized larger than flying machine 200 and enable flying machine 200 to lift off and fly within each of the regions. However, regions 910 and 912 constrain the flight of machine 200 within a limited space and thus limit the positioning of flying machine 200. Mechanical structure 900 further comprises a transition region 920. Transition region 920 enables flying machine 200 to fly between regions 910 and 912. Transition region 920 is sized larger than flying machine 200. In some embodiments, transition region 920 is at least 2, 3, 4, 5, 6, 7, 8, 9, or 10 times larger than flying machine 200. Mechanical structure 900 further comprises an exit 930 located within region 912 from which flying machine 200 can be released from structure 900.

Region 910 may include one or more takeoff positions. In order for a flying machine to be released from structure 900, the flying machine would need to take off from a takeoff position, fly through first region 910 to transition region 920, then pass through transition region 920, fly through region 912 to reach exit 930, and then pass through exit 930.

As illustrated, region 912 is positioned on top of region 910. As also illustrated, exit 930 is horizontally offset from transition region 920. This is merely illustrative and any other suitable configuration can be used. For example, some embodiments regions 910 and 912 can be positioned next to each other, where the transition region couples a right portion of region 910 to a left portion of region 912. In these embodiments, the transition region and the exit can be vertically spaced apart. In some embodiments, the transition region comprises a choke point that only enables a single flying machine to move through it at a time.

It will be understood that the shape of the regions depicted in FIG. 9 are merely illustrative and any suitable shapes and combination of regions can be used to create a mechanical test of a flying machine's performance capability. For example, a stricter performance test may use additional regions through which the flying needs to pass and/or smaller sized transition regions.

In some embodiments, structure 900 may be used with a charging station such as any of the charging stations depicted in FIGS. 1A, 1D, 2A, 2C, 2D, 3, and 7. For example, base 110 may be positioned within region 910. It will also be understood that structure 900 can be used with fixed wing flying machines as well as multicopter flying machines.

In some embodiments, the regions of structure 900 may not be fully enclosed. In some embodiments, the sides of structure 900 are omitted. For example, the top of region 910 and the top of region 912 may be made of netting with holes that form transition region 920 and exit 930. The netting may be suspended, for example, above a stage. In this embodiment, the netting may provide a performance check for the flying machines and also protect people and objects on the stage in the event a flying machine malfunctions after it has successfully navigated through the netting. For example, the netting can catch a malfunctioned flying machine. The netting will also reduce or prevent damage to a flying machine that has malfunctioned.

Flying machines that use structures 800 and 900 may be configured to perform autonomous or semiautonomous flights. For example, the flying machines may be configured to navigate structures 800 and 900 autonomously. The flying machines may store in internal memory data that represents the geometry of the structures (e.g., the passageway geometry of structure 800 and/or the geometry of regions 910, 912, and 920 of structure 900).

In some embodiments, structures 800 and 900 may be used for performing an automated performance check of a flying machine when launching. The method may comprise receiving a command at a flying machine to initiate an automated launch process and activating at least one actuator of the flying machine in response to receiving the command to initiate the automated launch process. The method may further comprise moving the flying machine, using the at least one actuator, from a take-off position through a first region that constrains movement of the flying machine to a transition region. The method may further comprise moving the flying machine, using the at least one actuator, through the transition region to a second region that constrains movement of the flying machine. The method may further comprise moving the flying machine, using the at least one actuator, through the second region to an exit in the second region, and moving the flying machine, using the at least one actuator, through the exit to complete the take-off procedure.

Figures 10A, 10B:
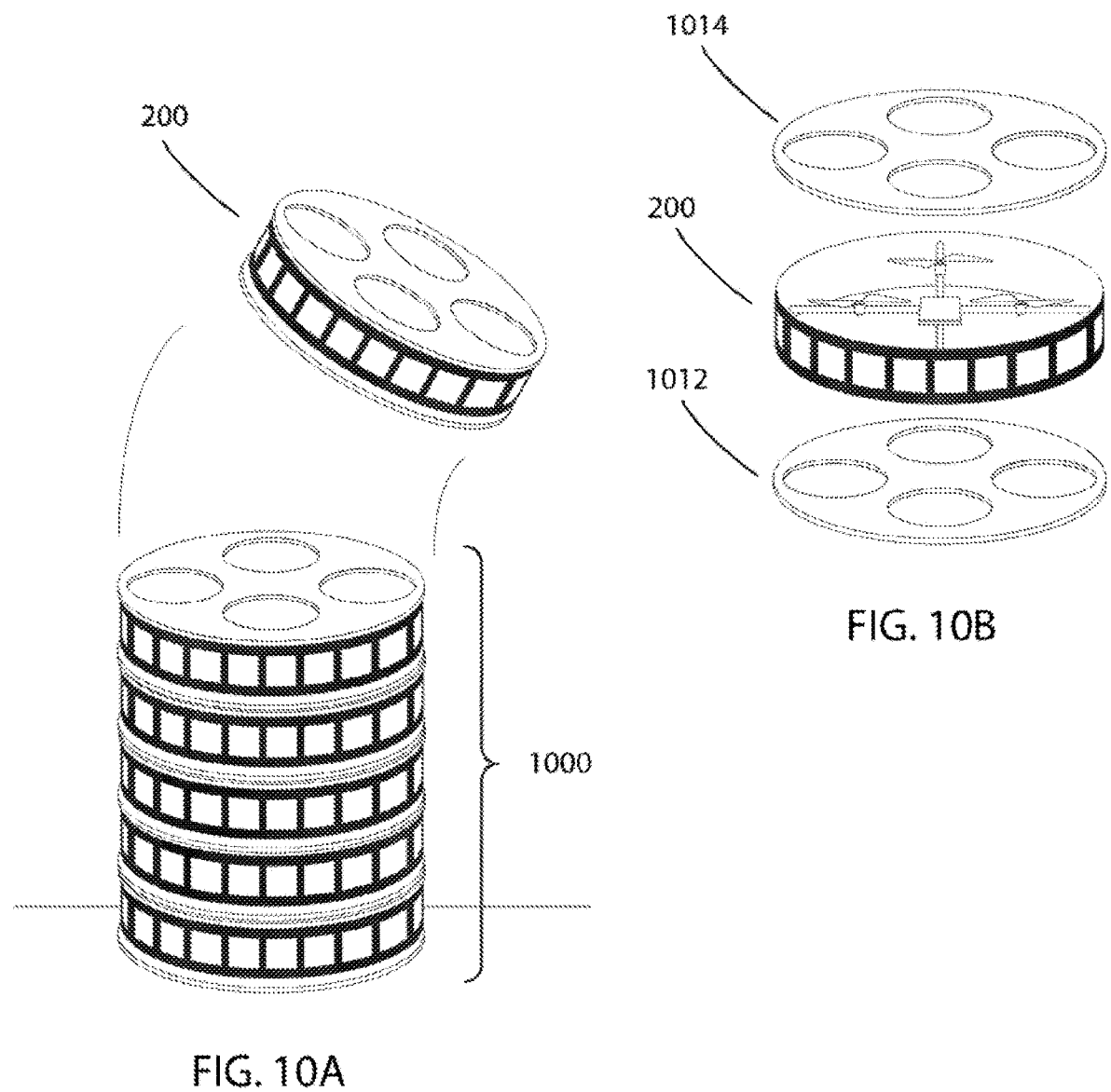
FIG. 10A shows an illustrative stack of flying machines in accordance with some embodiments of the present disclosure.
FIG. 10B shows an exploded view of a flying machine in accordance with some embodiments of the present disclosure.

In some embodiments, flying machines are used in a stacked configuration. Using a stacked configuration can provide a more efficient use of space (e.g., for taking off, landing, and storing). In some embodiments 5, 10, or more flying machines may be positioned in a stack. FIG. 10A shows an illustrative stack 1000 of flying machines 200 in accordance with some embodiments of the present disclosure. In some embodiments, the bottommost flying machine stack 1000 may be positioned on a charging station (e.g., charging station 602A of FIG. 6). Each of flying machines 200 may include a frame that generally surrounds the flying machine. The tops and bottoms of the frames may be shaped to enable a stable stack of freestanding flying machines to be created. The contact points of the frames of adjacent flying machines may include electrical connectors. In some embodiments, the electrical connectors of the frames may electrical couple the charging terminals of a charging station to each of the flying machines in the stack. This enables each flying machine in the stack to charge. In some embodiments, the electrical connectors of the frames may electrical couple a wired communication interface of a charging station to each of the flying machines in the stack. In some embodiments, the electrical connectors of the frames may enable each flying machine in the stack to charge and communicate with the charging station.

Flying machines 200 of stack 1000 may be programmed to take off sequentially, one at a time. FIG. 10A illustrates flying machines 200 taking off from the stack 1000. As shown, one flying machine 200 has taken off and six flying machines remain in stack 1000. In some embodiments, flying machines 200 may be configured to land in a stack.

In some embodiments, a stack of flying machines may be used as part of a performance. For example, a stack of flying machines can be used on a stage and the frames of each flying machine shaped and colored to look like a prop on the stage. The flying machines may be configured to take off from the stack, one at a time, perform a choreographed performance, and then land, one at a time, on top of each other to form a stack. As illustrated in FIG. 10A, the exterior of each flying machine 200 is shaped to look like a film reel. FIG. 10B shows an exploded view of a flying machine 200 of FIG. 10A in accordance with some embodiments of the present disclosure. The frame of flying machine 200 of FIG. 10B includes a circular bottom 1012 and a circular top 1014 that fits onto the main body of the flying body. Bottom 1012 and top 1014 include openings to permit air to pass through the flying machine. As shown, there are openings above and below each propeller. Therefore, the flying machine, which looks like film reel is able to successfully fly. It will be understood that flying machines may be shaped as any other type of prop in accordance with the present disclosure.

Figure 11:
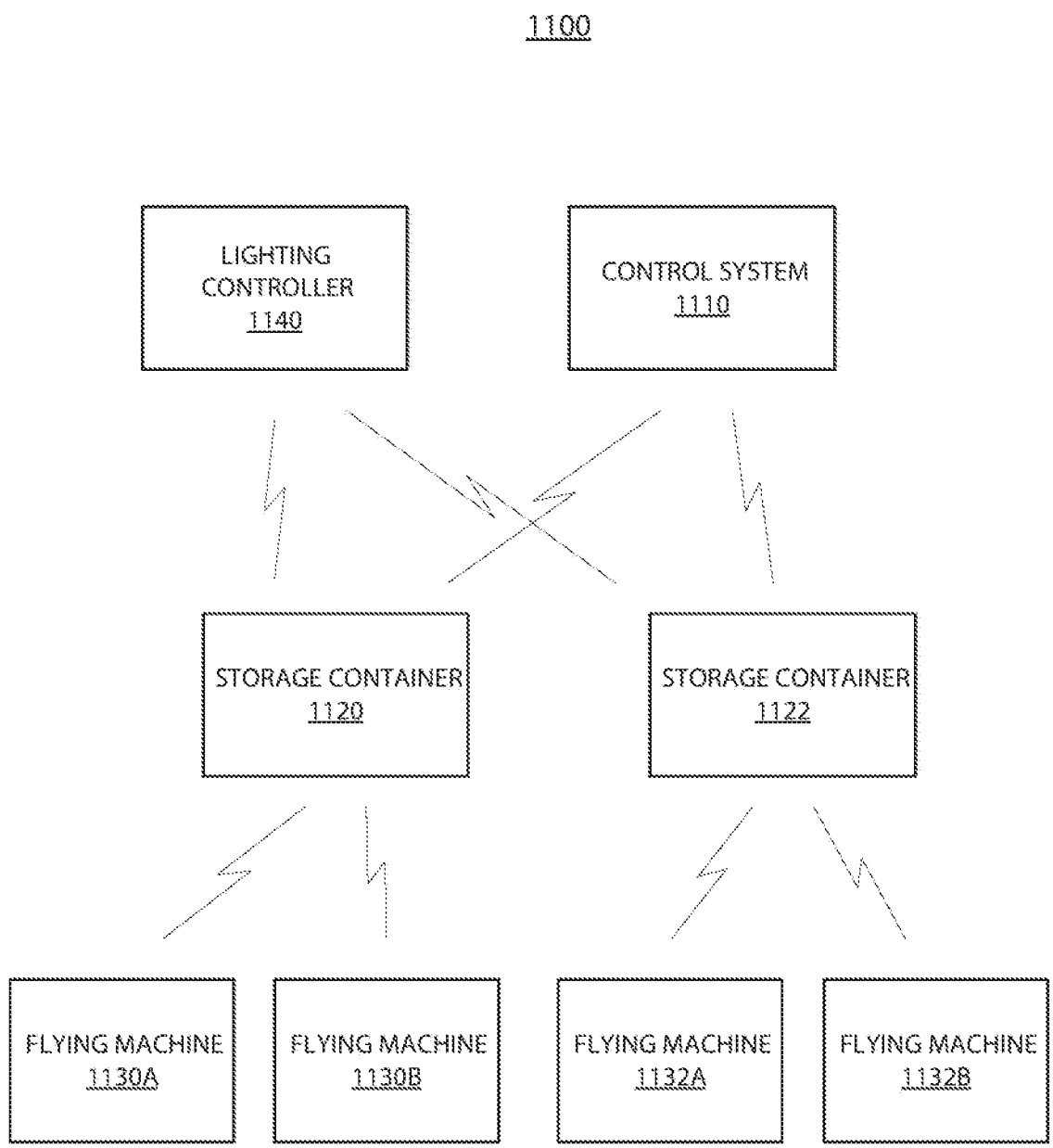
FIG. 11 shows a block diagram of an illustrative communication architecture in accordance with some embodiments of the present disclosure.

FIG. 11 shows a block diagram 1100 for a communication architecture in accordance with some embodiments of the present disclosure. The architecture may be used in a system for operating flying machines. The system may comprise a control system 1110 configured to store role information for flying machines and first and second flying machine storage containers 1120 and 1122.

In some embodiments, control system 1110 is configured to store or communicate role information. Role information contains specifics such as flight plans, lighting instructions, or payload parameters of a flying machine. A flight plan may comprise a flight path, which specifies a plurality of spatial coordinates for a flying machine to occupy, wherein each spatial coordinate is associated with a discrete time in a time period. Each flight plan may comprise at least one flight path, where a flight path is a series of spatial coordinates for a flying machine to occupy and where each spatial coordinate is associated with a discrete time in a time period. It should be understood that in some embodiments the flight plan may further comprise velocity, accelerations, orientations, and/or time values, for the machine. For example, the flight plan may specify that a flight path should be travelled at a velocity of 20 km/hr. It should be understood that the flight path may comprise any suitable parameters or values for the machine, but will always at least include a series of spatial coordinates. In an embodiment, each flight plant may further comprise a series of orientations for the flying machine, wherein each orientation is associated with a discrete time in a time period (e.g., in an embodiment each flight plan may further comprise an orientation for the aerial vehicle for each of the respective discrete times of a corresponding flight path, so as to provide a respective orientation for the vehicle for each respective spatial coordinate in that respective flight path). In yet a further embodiment, each flight plan may further comprise any one or more of velocity, acceleration, and/or yaw orientation for the flying machine for discrete times over a time period. In an embodiment, the flying machine may comprise a processor (e.g., control unit 530 of FIG. 5), which may be configured to determine the derivative of the spatial coordinates that are specified in a flight plan, with respect to time, so as to determine for each spatial coordinate, a velocity and/or acceleration for the flying machine. In an embodiment, each flying machine may comprise a processor (e.g., control unit 530 of FIG. 5), which may be configured to interpolate any of said spatial coordinates, orientations, velocity, acceleration, and/or yaw orientation, between two discrete times so as to determine spatial coordinates, orientations, velocity, acceleration, and/or yaw orientation for the flying machine during the period between said two discrete times. Similarly, in some embodiments, role information may store lighting information (e.g., light intensity, color) or relevant information for another type of payload (e.g., camera settings for a camera, tuning parameters such as gains for the controller of gimbal) or additional parameters for a flying machine (e.g., sensitivity settings for an anti-collision sensor mounted on the flying machine). Such role information may be similarly associated with spatial coordinates, discrete times, or be interpolated. In some embodiments, the role information for the flying machines stored at control system 1110 comprises flight path information for the flying machines to perform a choreographed performance. In some embodiments, the role information for the flying machines stored at control system 1110 comprises a plurality of specific roles for the flying machines.

In some embodiments, a flying machine storage container (e.g., storage container 1120) may be configured to store a first subset of flying machines (e.g., flying machines 1130A and 1130B); receive a first set of role information from the control system for the first subset of the flying machines; and communicate the first set of role information to the flying machines in the first subset of the flying machines. In some embodiments, a flying machine storage container (e.g., storage container 1122) may be configured to store a second subset of flying machines (e.g., flying machines 1130A and 1130B); receive a second set of role information from the control system for the second subset of the flying machines; and communicate the second set of role information to the flying machines in the second subset of the flying machines. In some embodiments, the first set of role information comprises a subset of the role information stored at the control system for the first subset of the flying machines. In some embodiments, the first flying machine storage container is configured to individually communicate with each of the first subset of the flying machines. In some embodiments, the first set of role information comprises a plurality of specific roles. In some embodiments, the first flying machine storage container is configured to transmit a specific role to each flying machine in the first subset based on a position of the flying machine in the first flying machine storage container.

In some embodiments, a flying machine storage container comprises a localization unit (e.g., localization unit 460 of FIG. 4) configured to determine the location of a flying machine storage container. In some embodiments, the flying machine storage container is configured to communicate its location to the control system. In some embodiments, the control system generates the first subset of role information based on the location of the first flying machine storage container.

In some embodiments, a first flying machine storage container is configured to identify which flying machines are stored at the first flying machine storage container; and to communicate the identity of the stored flying machines to the control system.

In some embodiments, the flying machine storage container is configured to release the first subset of flying machines one at a time from an exit; and communicate a specific role to each flying machine of the first subset one at a time prior to the flying machine being released from the exit.

Referring back to FIG. 10, in this example, storage container 1120 stores two flying machines 1130A and 1130B and storage container 1122 stores two flying machines 1132A and 1132B. Each of the storage containers has a communication system (e.g., communication interface 406 of FIG. 5) that allows it to communicate to the flying machines within the container. Such a communication could be wired. For example, it could use a controller area network (CAN) bus, universal asynchronous receiver transmitter (UART) pairs, or a serial peripheral interface (SPI), among others. Communication could also be wireless. For example, it could use near field communication (NFC), a IEEE 802.15 wireless personal area network (WPAN), a Bluetooth wireless connection, or an infrared optical communication interface, among others. The communication interface could be broadcast-based or bus-based. For example, a CAN bus or 802.11 UDP packets may be used. As another example, point-to-point (such as UART or NFC) may be used. In the case of broadcast- or bus-based communication systems, individual vehicles may be addressed through a unique identifier, for example by providing the identifier in the header of a message. In the case of a wired communication system, it is preferable to use connectors that provide little force countering the release of a flying machine from the storage container. Examples of such connectors are pogo pins, extra low release force connectors, and spring-type connectors.

In this exemplary embodiment, each storage container furthermore has a communication interface (e.g., external communication interface 440 of FIG. 4) that allows it to communicate with control system 1110, which may be integrated in an operator console. This interface can also be wireless or wired, with examples being listed above. In some embodiments, this communication interface is preferable configured to have longer range than the interface used to communicate between storage containers and flying machines. Examples of such protocols are Ethernet, CAN bus, 802.11 WLAN, and frequency-hopping spread-spectrum radios. This communication interface can also be connected to additional controllers, such as lighting controller 1140.

In this exemplary embodiment, control system 1110 allows an operator to define role information. Role information may, for example, specify which motions each of a number of flying machines is to execute. Control system 1110 communicates with the storage containers, which in turn communicate with the flying machines. This architecture can be preferable to control system 1110 communicating directly with the flying machines for a variety of reasons. For example, storage containers 1120 and 1122 may provide a wired connector at the storage location of the flying machine, which may save cost over or offer higher reliability than wireless connections. As another example, this architecture may be possible to position a storage container closer to the flying machines' operating area, which may in turn allow using low-power, low-range wireless communication that uses less power and weigh less than longer-range wireless radios. As another example, this architecture may allow reducing weight or power penalties on the flying machines by implementing a high-bandwidth communication interface with the storage container. As another example, this architecture may offer operational simplifications by allowing an operator to address containers of flying machines rather than individual flying machines, which may be particularly beneficial when operating large numbers of flying machines. As another example, this architecture may reduce errors by providing additional checks at the level of each storage container. Each of storage containers 1120 and 1122 may determine parameters (e.g., a flying machine's or storage container's identifier, overall status, battery charge, orientation, a flying machine's position inside the storage container; a flying machine's role, etc.). Such data may then, for example, be compared with target parameters (e.g., safety thresholds, desired or expected parameter values). Such comparison may happen at the storage container level, at the control system level, at the flying machine level, or at multiple levels. Such comparisons may also involve a human operator. As a result of a comparison, a specific action may be triggered automatically or by an operator.

Secondary control systems may also communicate with the storage containers, for example, lighting controller 1140. Lighting controller 1140 could adjust, for example, the intensity and color of the lights of the flying machines by sending lighting commands to the storage containers through the communication interface of lighting controller 1140. In some embodiments, the communication interface of lighting controller 1140 is similar to the communication interface of control system 1110. The storage containers may then, for example, split these commands into separate commands for individual flying machines, and may then send these separate commands to flying machines through the communication interface between storage containers and flying machines.

It will be understood that block diagram 1100 is merely illustrative and that various modifications to the architecture can be made within the scope of the present disclosure. For example, in some embodiments, the architecture of block diagram 1100 does not include lighting controller 1140. In addition, while only two storage containers are depicted, any suitable number of storage containers may be used such as 3, 4, 5, 6, 7, 8, 9, 10 or more. It will also be understood that each storage container may be configured to store any suitable number of flying machines such as 3, 4, 5, 6, 7, 8, 9, 10 or more. It will also be understood that storage containers 1120 and 1122 can be any of the storage containers described herein. For example, storage containers 1120 and 122 can be any of the storage containers depicted in FIGS. 1A-D, 3, and 4. It will also be understood that flying machines 1130A, 1130B, 1132A, and 1132B can be any of the flying machines described herein.

Exemplary communication architectures will be described below. It will be obvious to those skilled in the art that several other communication architectures are straightforward variations of these examples within the scope of the present disclosure.

In an example of a centralized architecture, a lighting controller (e.g., lighting controller 1140) may first determine how many flying machines are present in each storage container. For this, it sends a flying machine count request message to each storage container (e.g., storage containers 1120 and 1122). Each storage container sends a ping request on each of its point-to-point interfaces and then waits a predefined duration for a response. If a response arrives within the time, the slot is deemed "occupied"; otherwise it is deemed "empty". The container generates a map that stores, for each point-to-point interface, the occupation status. It then counts the number of "occupied" slots and provides that count as a response to the lighting controller. The lighting controller determines a brightness level for each storage container. The lighting controller transmits the brightness level and color information to each storage container; upon reception, the storage container forwards the brightness level and color to the individual flying machines through the point-to-point interfaces. Each flying machine to adjusts the brightness and color of its on-board light to match the command (e.g., by adjusting the PWM duty cycle).

In this example of a centralized architecture, a control system (e.g., control system 1110) may first determine a list of available flying machines. For this, it may sequentially communicate with each storage container (e.g., storage containers 1120 and 1122) by sending the storage container a flying machine enumeration request. Upon receipt of such an enumeration request, the storage container requests status information from the flying machine within the storage container through its secondary communication interface. Each of the flying machines responds to the status information request by providing its unique identifier ("flying machine ID") and status information relevant to the role mapping (e.g., the flying machine's readiness to fly, battery charge status, and its maximum flight speed). The storage container aggregates this status information from each of the flying machines within the container, and then returns the list of flying machine IDs and status information to the control system. The storage container may also provide its own status information (e.g., a unique identifier of the container and its position and orientation) to the control station. The control system aggregates the flying machine information (flying machine IDs and status information) and storage container information. The control system may then determine which flying machine should perform which of the available roles, and creates a map of which flying machine is stored in which container. To operate the flying machines, the control system first determines which of the storage containers will be used for the flight. For each storage container that will be used, the system aggregates a list of flying machines that shall be give a role, and transmits this list to the storage container. Upon receipt of this list by the storage container, the storage container communicates with the flying machines (either one-by-one or in a broadcast fashion), sending each flying machine the role information that is addressed to that flying machine.

In an example of a distributed architecture, each storage container (e.g., storage containers 1120 and 1122) continuously monitors the number and ID of flying machines within it. For this, it may periodically (e.g., once per second) send a ping request through its secondary communication interface. All flying machines are configured to respond to such ping requests; the storage container can thus aggregate responses to its ping request to create a map of vehicles stored within it.

In an example of a distributed architecture, a lighting controller (e.g., lighting controller 1140) stores a list of available storage containers. The lighting controller provides a means to adjust the intensity and color of each storage container, for example through a DMX interface to a lighting console, or through jog dials on the lighting controller. The lighting controller may periodically (e.g., 100 times per second) transmit the requested color and intensity to each storage container. Upon reception, the storage container determines the current number of flying machines in the container by counting the elements in the vehicle map. The storage container then adjusts the lighting command to the number of vehicles (e.g., by maintaining the color command, and dividing the intensity command by the number of vehicles in the storage container in order to maintain constant intensity independently of the number of flying machines present), and addresses all vehicles to transmit the requested intensity and color. The flying machines adjust their light source to the requested lighting.

In an example of a distributed architecture, a control system (e.g., control system 1110) stores a list of roles for the flying machines. For each role, it may additionally store a container position. To command the flying machines to fly, the control system broadcasts a list of roles, each with the associated container position. The list is preferably transmitted in the order of importance of the roles (e.g., starting with the roles that are most important to the choreography). All storage containers receive this list. Each storage container determines its current position (e.g., using a localization unit, using a global positioning system (GPS), or by using cameras on the storage container and detecting land marks) when it receives the broadcasted list. For each item in the list, the storage container then compares its current position to the container position associated with the role. If the current position is sufficiently close to the container position associated with the role (e.g., if it is within 1 m), then the storage container communicates with a vehicle in its stored vehicle map, commanding that vehicle to execute the role at the current list position. The container maintains a list of which flying machines have already been mapped a role. If all flying machines within the storage container have been allocated a role or if the end of the list is reached, the processing of the broadcasted list stops.

According to an aspect of the present disclosure, a method for programming flying machines is provided. The method may comprise the steps of (1) determining, using a control system, a first set of role information to be transmitted to a first flying machine storage container; (2) transmitting, using the control system, the first set of role information to the first flying machine storage container; (3) receiving, using the first flying machine storage container, the first set of role information; (4) transmitting, using the first flying machine storage container, the first set of role information to a first plurality of flying machines stored at the first flying machine storage container; (5) determining, using a control system, a second set of role information to be transmitted to a second flying machine storage container; (6) transmitting, using the control system, the second set of role information to the second flying machine storage container; (7) receiving, using the second flying machine storage container, the second set of role information; and (8) transmitting, using the second flying machine storage container, the second set of role information to a second plurality of flying machines stored at the second flying machine storage container.

In some embodiments, a method for launching flying machines comprises the following steps in the following order: (1) transmitting (e.g., from a control system or storage container) an instruction to a flying machine to power up in a predetermined time interval (e.g., 5 minutes), (2) receiving the instruction at a flying machine, (3) starting a countdown timer at the flying machine, (4) at the end of the countdown timer, powering up ("arming") the flying machine, (5) performing one or more preflight checks, and (6) taking off. This may be achieved by, for example, using a low-power wireless receiver to receive wireless signal such as Bluetooth low-energy, ZigBee, Wi-Fi, UWB, or a signal using the near-field communications (NFC) standard for transmitting and receiving instructions; by equipping a flying machine with a low-power circuit to listen for wireless signals in addition to its main electronics, which consume significantly more power. Preflight checks may, for example, include comparing a flying machine's battery level to requirements of a role, comparing the status of a flying machine sensor to a predefined threshold or range, comparing motor performance to expected values, evaluating the outcome of a flying machine's component's self-checks. In some embodiments, a flying machine may execute flight maneuvers according to its role information upon takeoff. In some embodiments, takeoff of multiple flying machines may be managed by using synchronizing clocks (e.g., a clock used by a localization unit 540 on a flying machine and a clock used by a localization unit 460 off board) and by coordinating predefined takeoff times (e.g., from a control system).

While certain aspects of the present disclosure have been particularly shown and described with reference to exemplary embodiments thereof, it will be understood by those of ordinary skill in the art that various changes in form and details may be made therein without departing from the spirit and scope of the present disclosure as defined by the following claims. It is therefore desired that the present embodiments be considered in all respects as illustrative and not restrictive, reference being made to the appended claims rather than the foregoing description to indicate the scope of the disclosure.

What is claimed:

1. A system, comprising:
 a plurality of charging stations, each configured to receive and store a flying machine of a plurality of flying machines; and
 a charging module coupled to the plurality of charging stations, wherein the charging module is configured to regulate a battery of one of the flying machines, at one of the charging stations, to a specific state of charge for storage.

2. The system of claim 1, further comprising:
 a control system coupled to the charging module and configured to store role information for the plurality of flying machines.

3. The system of claim 2, wherein the control system is configured to transmit role information to the one flying machine.

4. The system of claim 2, wherein the charging module is configured to regulate the battery of the one flying machine based on the role information.

5. The system of claim 2, wherein the role information comprises flight plans for the plurality of flying machines.

6. The system of claim 5, wherein the flight plans comprise time values.

7. The system of claim 1, wherein the charging module is further configured to perform battery balancing of the battery of the one flying machine.

8. The system of claim 1, wherein the charging module is further configured to determine a remaining useful life of the battery of the one flying machine.

9. The system of claim 1, wherein the charging module is configured to regulate batteries of a plurality of flying machines at the plurality of charging stations to a specific state of charge for storage.

10. The system of claim 9, further comprising:
a clamping mechanism configured to secure the plurality of flying machines at the plurality of charging stations.

11. The system of claim 1, further comprising control circuitry configured to identify which flying machines are stored at the plurality of charging stations.

12. The system of claim 1, further comprising:
a base that comprises the plurality of charging stations; and
a lid that is securable to the base.

13. The system of claim 12, further comprising:
a clamping mechanism configured to secure the lid to the base.

14. A method, comprising:
storing, in memory, role information for one or more flying machines;
determining whether a flying machine, at one of a plurality of charging stations, is being stored based on the role information; and
regulating, using a charging module, a battery of the flying machine to a specific state of charge for storage.

15. The method of claim 14, wherein the role information comprises a flight plan for the flying machine.

16. The method of claim 15, wherein the flight plan comprises time values.

17. The method of claim 14, further comprising:
performing, using the charging module, battery balancing of the battery of the flying machine.

18. The method of claim 14, further comprising:
determining, using the charging module, a remaining useful life of the battery of the flying machine.

19. The method of claim 14, wherein the plurality of charging stations are located on a base, the method further comprising:
positioning a lid on the base.

20. The method of claim 19, further comprising:
securing the lid to the base using a clamping mechanism.

* * * * *